United States Patent [19]

Sugaya

[11] Patent Number: 5,617,525
[45] Date of Patent: Apr. 1, 1997

[54] IMAGE OUTPUTTING ADAPTABLE TO VARIOUS FONTS

[75] Inventor: Akio Sugaya, Yokohama, Japan

[73] Assignee: Canon Kabushiki Kaisha, Tokyo, Japan

[21] Appl. No.: 39,821

[22] Filed: Mar. 30, 1993

[30] Foreign Application Priority Data

Mar. 30, 1992 [JP] Japan ................................. 4-074596
Oct. 30, 1992 [JP] Japan ................................. 4-315881

[51] Int. Cl.⁶ ..................................................... G06F 3/00
[52] U.S. Cl. ......................................... 395/805; 395/261
[58] Field of Search ................................ 395/150, 151, 395/110, 115

[56] References Cited

U.S. PATENT DOCUMENTS

| | | | |
|---|---|---|---|
| 4,901,249 | 2/1990 | Shiota | 395/115 |
| 4,962,465 | 10/1990 | Saito et al. | 395/150 |
| 5,018,217 | 5/1991 | Yoshida et al. | 395/150 |
| 5,148,519 | 9/1992 | Ishii | 395/150 X |
| 5,233,685 | 8/1993 | Landes et al. | 395/147 |
| 5,313,573 | 5/1994 | Takahama | 395/150 |
| 5,355,448 | 10/1994 | Uchino | 395/150 |

FOREIGN PATENT DOCUMENTS

| | | |
|---|---|---|
| 354024 | 2/1990 | European Pat. Off. . |
| 453221 | 10/1991 | European Pat. Off. . |
| 478304 | 4/1992 | European Pat. Off. . |
| 19275 | 12/1991 | WIPO . |

*Primary Examiner*—Heather R. Herndon
*Assistant Examiner*—Cliff N. Vo
*Attorney, Agent, or Firm*—Fitzpatrick, Cella, Harper & Scinto

[57] ABSTRACT

A group of selected character codes is converted into character patterns in advance and stored in a font cache memory, and, when one of the character codes is received as the printing instruction, such pre-converted character pattern is utilized for printing. Thus the conversion into the character pattern can be dispensed with at each code reception, and the time required for such conversion can be shortened.

14 Claims, 23 Drawing Sheets

CONVERSION INFORMATION 1

| APPEARANCE COUNTER |
| FONT SCALER INFORMATION |
| CHR SET ID |
| CHR FORM |
| CHR CODE |
| ⋮ |
| APPEARANCE COUNTER |
| FONT SCALER INFORMATION |
| CHR SET ID |
| CHR FORM |
| CHR CODE |
| ⋮ |

CONVERSION INFORMATION 2

| APPEARANCE COUNTER |
| FONT SCALER INFORMATION |
| CHR SET ID |
| CHR FORM |
| CHR CODE |
| ⋮ |
| APPEARANCE COUNTER |
| FONT SCALER INFORMATION |
| CHR SET ID |
| CHR FORM |
| CHR CODE |
| ⋮ |

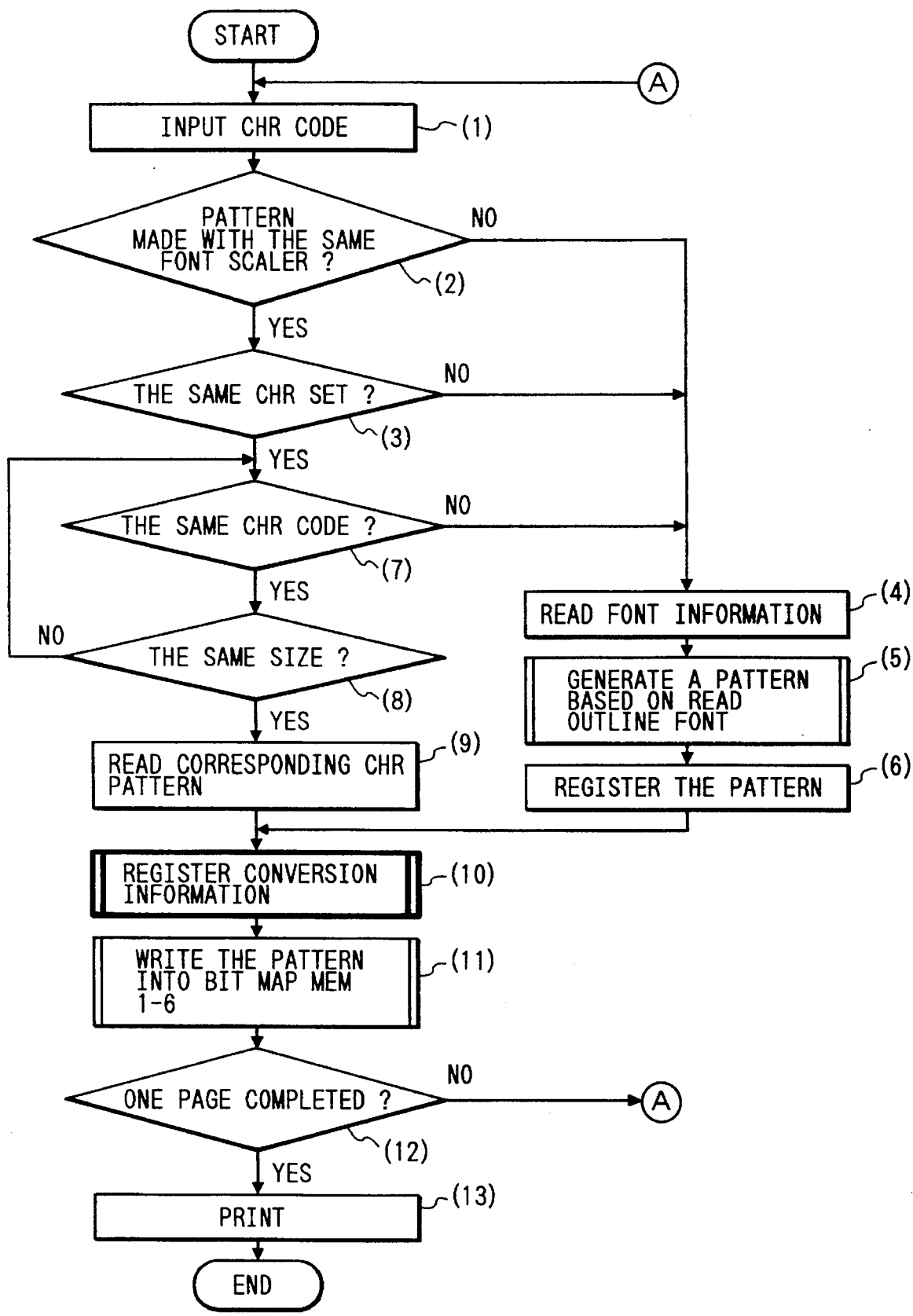

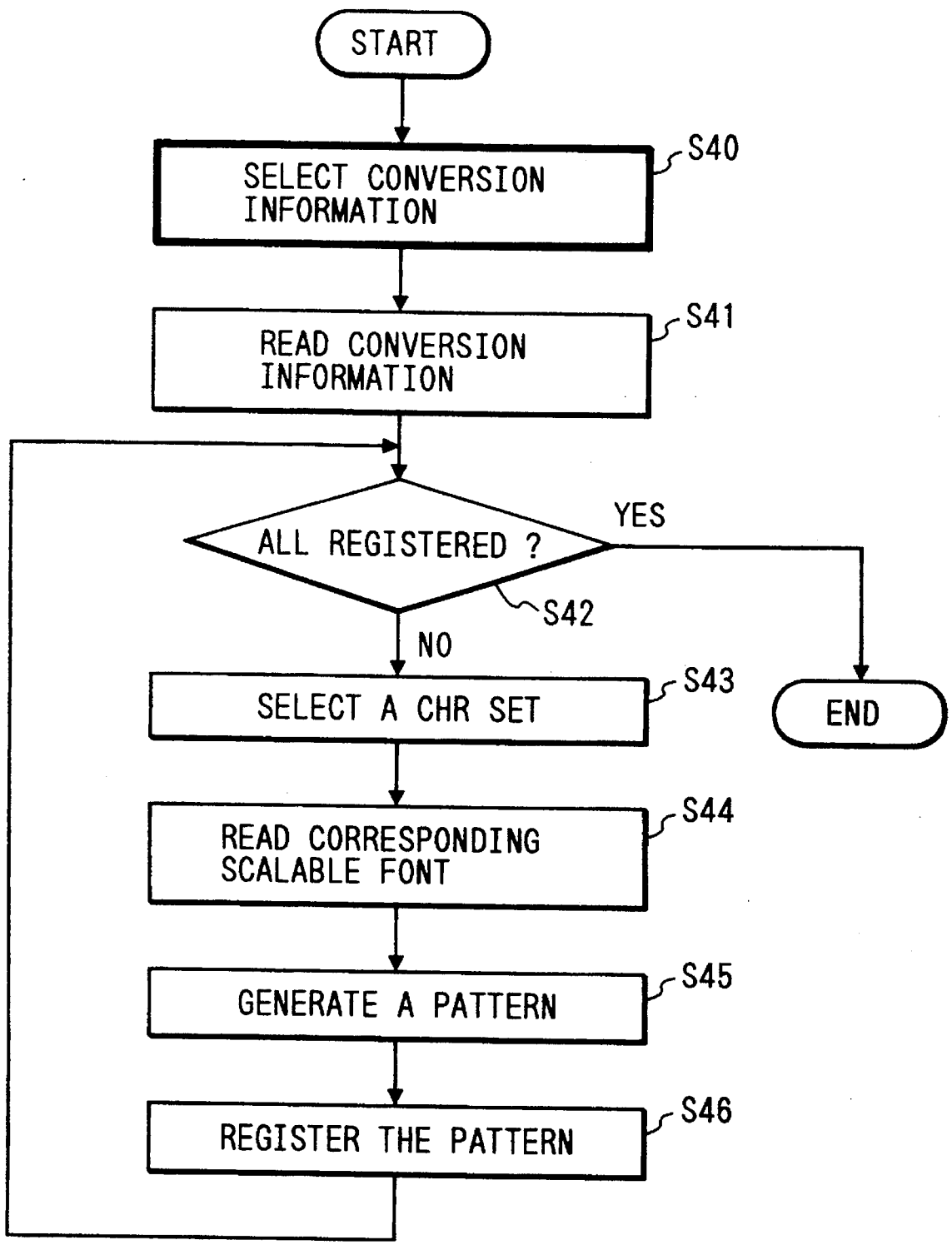

FIG. 30A

CONVERSION INFORMATION 1

| APPEARANCE COUNTER |
| CHR SET ID |
| CHR FORM |
| CHR CODE |
| ⋮ |
| CHR CODE |
| CHR SET ID |
| CHR FORM |
| CHR CODE |
| ⋮ |

FIG. 30B

CONVERSION INFORMATION 2

| APPEARANCE COUNTER |
| CHR SET ID |
| CHR FORM |
| CHR CODE |
| ⋮ |
| CHR CODE |
| CHR SET ID |
| CHR FORM |
| CHR CODE |
| ⋮ |

# IMAGE OUTPUTTING ADAPTABLE TO VARIOUS FONTS

BACKGROUND OF THE INVENTION

1. Field of the Invention

The present invention relates to an image output method of registering converted character patterns in a font cache memory, and, in response to the reception of a code corresponding to one of said character patterns, forming a visible memory by the character pattern registered in said font cache memory, and an apparatus therefor.

2. Related Background Art

There are recently commercialized various apparatus, such as laser beam printer, adopting a scalable font such as outline font.

Said outline font is featured by the easiness in working on the desired characters, but necessitates a longer time required for generating the character dot pattern. For this reason, the character pattern which has been used at least once in the past is registered in the font cache memory, together with the information on "character set identification (for example gothic style)", "character code" and "size (height and width of character)", and, when the same character is instructed, the character pattern is read from the font cache memory and developed into dot form. Thus the processing time of the apparatus is shortened by effecting the generation of the character pattern only once for the character of same code and same style.

It will be understood that, in the conventional method mentioned above, the character pattern is generated at the entry of a character code and thus generated character pattern is registered in the font cache memory. For this reason, the character pattern registered in the font cache memory can be utilized for the second and subsequent entries of the character code, but the effect of process time reduction cannot be attained for the character code entered for the first time, as the generation of the character pattern has to be executed anew.

Also in the conventional recording apparatus as explained above, the outline font is usually composed of a train of contour coordinates representing the form of the character, but there exist various methods for forming such coordinates. For this reason, in the apparatus there is provided, according to the method of constituting the outline font, exclusive means for generating character dot patterns (font scaler or rasterizer). Consequently, if there are employed multiple outline fonts constituted by plural methods, there have to be provided font scalers respectively corresponding to such methods.

Also the character dot patterns generated by such different font scalers may be mutually different, even for a same style, a same size and a same character code, because of differences in the constituting method of the font, in the designing of character shape or in the process in the font scalers.

For this reason, a character dot pattern, which has been used at least once in the past, is registered in the font cache memory together with the information of font scaler, character set identification, character code and size, and is read from the font cache memory area and is developed into a character dot pattern in response to the entry of the same character code. In this manner the process time of the apparatus for pattern generation can be reduced by effecting the generation only once in each font scaler for a same character dot pattern.

In such conventional recording apparatus with plural font scalers, since the font cache memory only registers the information of the character set identification, character code and size, there has been a drawback that the character dot patterns prepared by different font scalers cannot be identified.

Also since the character pattern is generated only at the end of the character code, in a mode of use of the recording apparatus in which the content of the output character information is frequently changed, the advantage of the font cache memory cannot be expected for the character code entered for the first time, and there is required a considerable time before the character is printed.

SUMMARY OF THE INVENTION

In consideration of the foregoing, an object of the present invention is to provide an image output method of generating patterns corresponding to predetermined codes and storing said patterns in a memory prior to the entry of codes as image information, and utilizing thus stored patterns for output in response to the entered codes, thereby reducing the time required for dot pattern development and increasing the process speed, and an apparatus adapted for executing such method.

Another object of the present invention is to provide an image output method of developing code information, stored in information development memory means, into a pattern according to the form information stored in said information development memory means, then registering such developed pattern in pattern memory means, and in response to the input data which coincide with the code information and the form information stored in the pattern memory means, executing the pattern development of said input data utilizing the developed information registered in said pattern memory means, and an apparatus adapted for executing such method.

Still another object of the present invention is to provide an image output method of storing identification data for identifying plural font scalers, together with the generated character pattern and the character development information, thereby enabling to read character patterns corresponding to each font scaler, and an apparatus adapted for executing such method.

Still another object of the present invention is to provide an image output method of individually memorizing different character form information corresponding to a same character code, also memorizing each character pattern generated according to said memorized character form information, each character code, each character form information and information on each generating means, then comparing thus memorized character code, character form information and information generating means with those of entered print information, and reading the memorized character pattern based on the result of said comparison, and an apparatus adapted for executing such method.

Still another object of the present invention is to provide an image output apparatus comprising selection means for selecting predetermined developed information of plural kinds stored in developed information memory means, and/or modification means for modifying the predetermined developed information stored in the developed information memory means.

Still another object of the present invention is to provide an image output method of individually memorizing different character form information corresponding to a same character code, also memorizing each character pattern generated corresponding to thus memorized character form information, each character code, each character form information and information on each generating means, then comparing thus memorized character code, character form information and information on generating means with those in the entered print information, and reading the memorized character pattern from generated pattern memory means based on the result of said comparison and under the control of control means, whereby, even in case of forming character patterns of different forms, a desired character pattern can be read with the identification of the form of already memorized character pattern, and an apparatus adapted for executing such method.

Still another object of the present invention is to provide an image output method of, when each generating means generates a character pattern of a different form by referring to each character form information stored in each font memory, storing each generated character pattern, the character form information of each character pattern, information on the generating means for each character pattern and each character code in generated pattern memory means, comparing each character code, each character form information and information on each generating means in the input print information with those stored in said generated pattern memory means and reading each character pattern from the generated pattern memory means under the control of control means, whereby the readout of a desired character pattern can be achieved, even in case of generating a character pattern of a different form, by identifying the form of the already stored character pattern, and an apparatus adapted for executing such method.

Still another object of the present invention is to provide an image output method wherein, when each generating means generates a character pattern of a different form by referring to each character form information stored in each font memory and when each generated character pattern, the character form information of each character pattern, the information on the generating means for each character pattern and each character code are stored in generated pattern memory means, registration means automatically registers, in the generated pattern memory means, each character pattern generated by each generating means and predetermined development information corresponding to each character pattern based on predetermined development information stored in advance in development information memory means, whereby each desired character pattern corresponding to each generating means can be registered in classified manner in the generated pattern memory means, and an apparatus adapted for executing such method.

Still another object of the present invention is to provide an image output method of individually storing different character form information corresponding to a same character code, also storing each character pattern generated from said stored character form information, each character code, each character form information and information on each generating means, then comparing said stored character code, character form information and information on the generating means with those in the input print information, and reading a character pattern based on the result of said comparison under the control of control means, whereby a desired character can be read, even in case of forming a character pattern of a different form, by identifying the form of the already stored character pattern, and an apparatus adapted for executing such method.

Still another object of the present invention is to provide an image output method of selecting predetermined development information of plural kinds stored in development information memory means, thereby being capable of registering character patterns according to various development information in generated pattern memory means, and an apparatus adapted for executing such method.

Still another object of the present invention is to provide an image output method of:

generating in advance a pattern, based on code information to be converted into pattern and font scaler information;

storing said generated pattern together with said corresponding code information and said font scaler information; and controlling the output utilizing said stored pattern, based on code information representing the pattern to be obtained as output, and an apparatus adapted for executing such method.

Still another object of the present invention is to provide an image output method of:

storing in advance plural font scaler information required for converting scalable font into a dot pattern;

selecting a font scaler according to information for selecting one of said plural font scaler information; and converting the scalable font into a dot pattern for caching, based on the selected font scaler, and an apparatus adapted for executing such method.

BRIEF DESCRIPTION OF THE DRAWINGS

FIG. 16 is a flow chart showing an example of the fourth character pattern generating sequence in a character processing method embodying the present invention;

FIG. 25 is a flow chart showing the sequence of the character pattern registration into the font cache memory;

FIGS. 30A and 30B are views showing the data format in the conversion information memory in an embodiment 8.

DESCRIPTION OF THE PREFERRED EMBODIMENTS

[1st embodiment]

Figure 1:
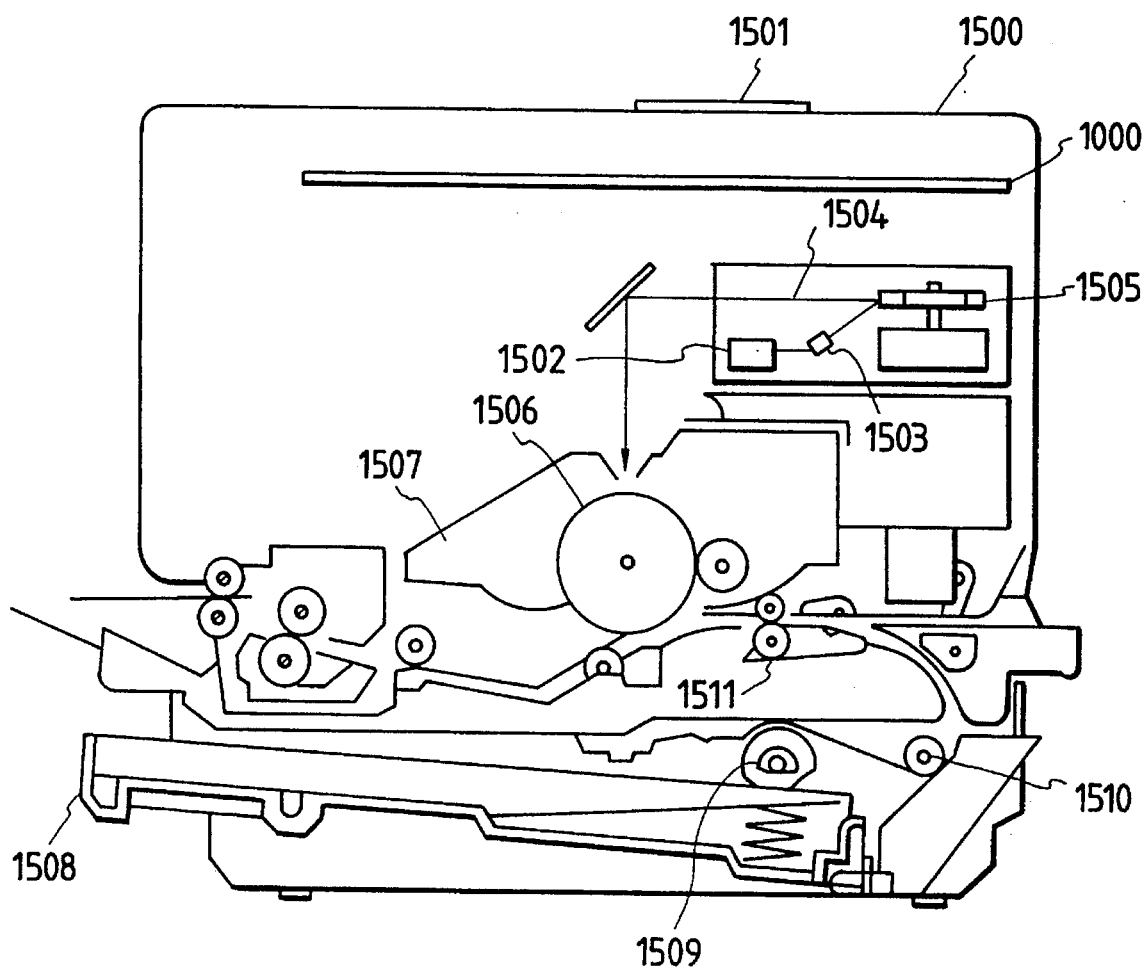
FIG. 1 is a cross sectional view of a recording apparatus capable of executing the character processing method of the present invention.

FIG. 1 is a cross-sectional view of a recording apparatus, such as a laser beam printer, in which the character processing method of the present invention is applicable.

A main body 1500 (printer) of the apparatus receives and stores print information (character codes etc.), form information and macro instructions supplied from an external host computer, generates character patterns (to be generated by the character pattern process of the present invention) and form patterns, and forms an image on a recording sheet constituting the recording medium. There are also shown an operation panel 1501 including switches and LED indicators for various operations, and a printer control unit 1000 for controlling the entire printer 1500 and analyzing the character information supplied from the host computer. Said printer control unit 1000 converts the character information into a video signal of corresponding character patterns for supply to a laser driver 1502, which drives a semiconductor laser 1503 and on-off switches the laser beam 1504 emitted from said semiconductor laser 1503 according to the input video signal. The laser beam 1504 is laterally deflected by a rotary polygon mirror 1505 to scan an electrostatic drum 1506, thereby forming an electrostatic latent image of a character pattern thereon. Said latent image is developed into a visible image by a developing unit 1507 positioned around the electrostatic drum 1506, and is transferred onto the recording sheet, which is composed of a cut sheet, contained in a cassette 1508 mounted on the main body 1500 and supplied therefrom by a feed roller 1509 and transport rollers 1510, 1511 to said electrostatic drum 1506.

Figure 2:
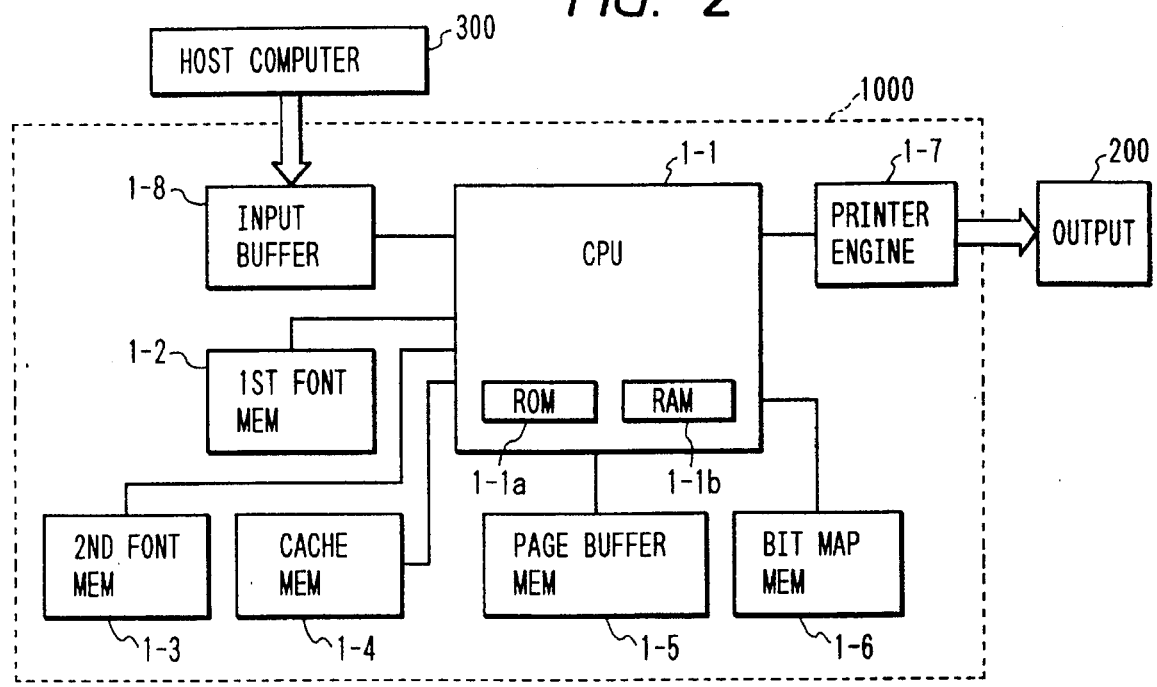
FIG. 2 is a block diagram of a character processing apparatus constituting a first embodiment of the present invention.

FIG. 2 is a block diagram showing the configuration of a character processing apparatus constituting a 1st embodiment of the present invention, wherein same components as those in FIG. 1 are represented by same numbers.

There are provided a reception buffer 1-8 for storing the data received from a host computer 300; and a CPU 1-1 provided with a ROM 101a and a RAM 101b and adapted to control the various units according to a character processing program and a printing program stored in the ROM 1-1a and shown in flow charts to be shown later.

There are further provided a first font memory 1-2 storing an outline font to be used by a first font scaler; a second font memory 1-3 storing an outline font to be used by a second font scaler; a cache memory 1-4 for storing character patterns to be generated, based on the outline fonts stored in the second font memory 1-3 and the first font memory 1-2; a page buffer 1-5 for storing the received data in the unit of a page; and a bit map memory 1-6 for storing output image information of a page, which is to be supplied to a printer engine 1-7 (cf. FIG. 1) for obtaining an output image 200.

In the character processing apparatus of the above-explained configuration, when the generating means (by functions of the CPU 1-1) generate character patterns of different forms by referring to the character form information respectively stored in the font memories 1-2, 1-3, each generated character pattern, the character form information of each character pattern, the information on the generating means for each character pattern and each character code are stored in the generated pattern memory means (cache memory 1-4). Then each character code, each character form information and the information on each generating means in the input print information are compared with those stored in said generated pattern memory means, and the readout of each character pattern from said generated pattern memory means is controlled by the control means (CPU 1-1). Thus it is rendered possible, even in case of forming character patterns of different forms, to read a desired character pattern, while identifying the forms of already stored character patterns.

Figure 3:
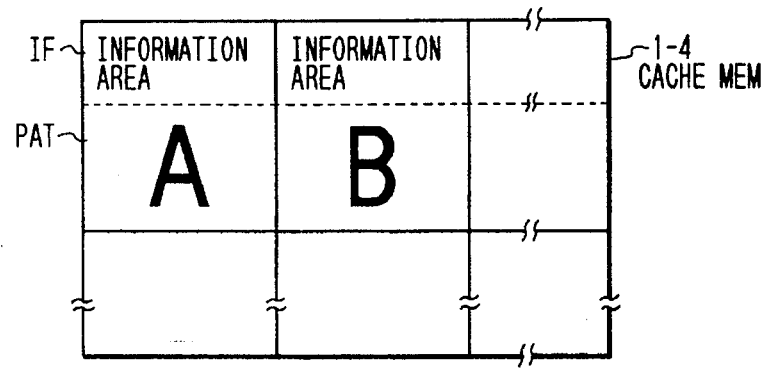
FIG. 3 is a schematic view showing the data storage state in a cache memory 1-4 shown in FIG. 1.
Figure 4:
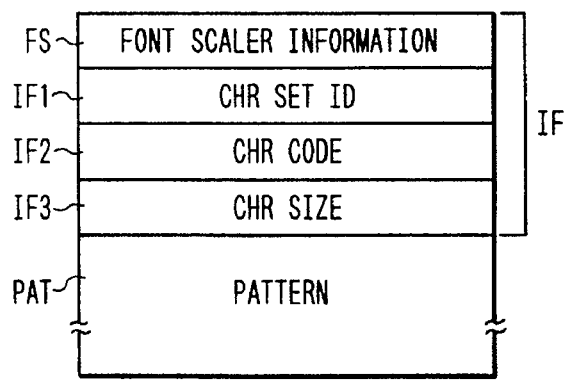
FIG. 4 is a view showing the data format of an information area IF and a pattern storage area PAT of the cache memory 104 shown in FIG. 3.

FIG. 3 is a schematic view showing the data storage state in the cache memory 1-4 shown in FIG. 1, and FIG. 4 is a view showing the data structure in an information area IF and a pattern area PAT in the cache memory 1-4 shown in FIG. 3.

As shown in these drawings, the character patterns generated by the first and second font scalers are stored in the pattern area PAT, and the conversion information relative to said character patterns are stored in the information area IF (cf. FIG. 3). Also as shown in FIG. 4, the information area IF stores font scaler information FS (an identification number representing the composing method of outline font or scalable font; the font of each company relies on each independent format (for example information on start and end of a straight line) and each independent character design, requiring a corresponding magnification change and a hardware or a software for developing into a dot pattern. This information identifies these parameters, and corresponds to the information on generating means in the present invention), a character set identifier IF1 (representing the character style such as Gothic), a registered character code IF2, and a character size IF3 of said character pattern (size being defined by the width and the height). The development means conversion into bit map data.

In the present embodiment, the character set can be defined by the data including the character pitch, the orientation such as vertical/horizontal writing, the graphic set such as ASCII, and the type face such as Courrier (type style such as Gothic), and corresponds to characters of a code system (for example of 8 bits) within a font (a group of characters represented by same data except for the above-mentioned graphic set).

Figure 5:
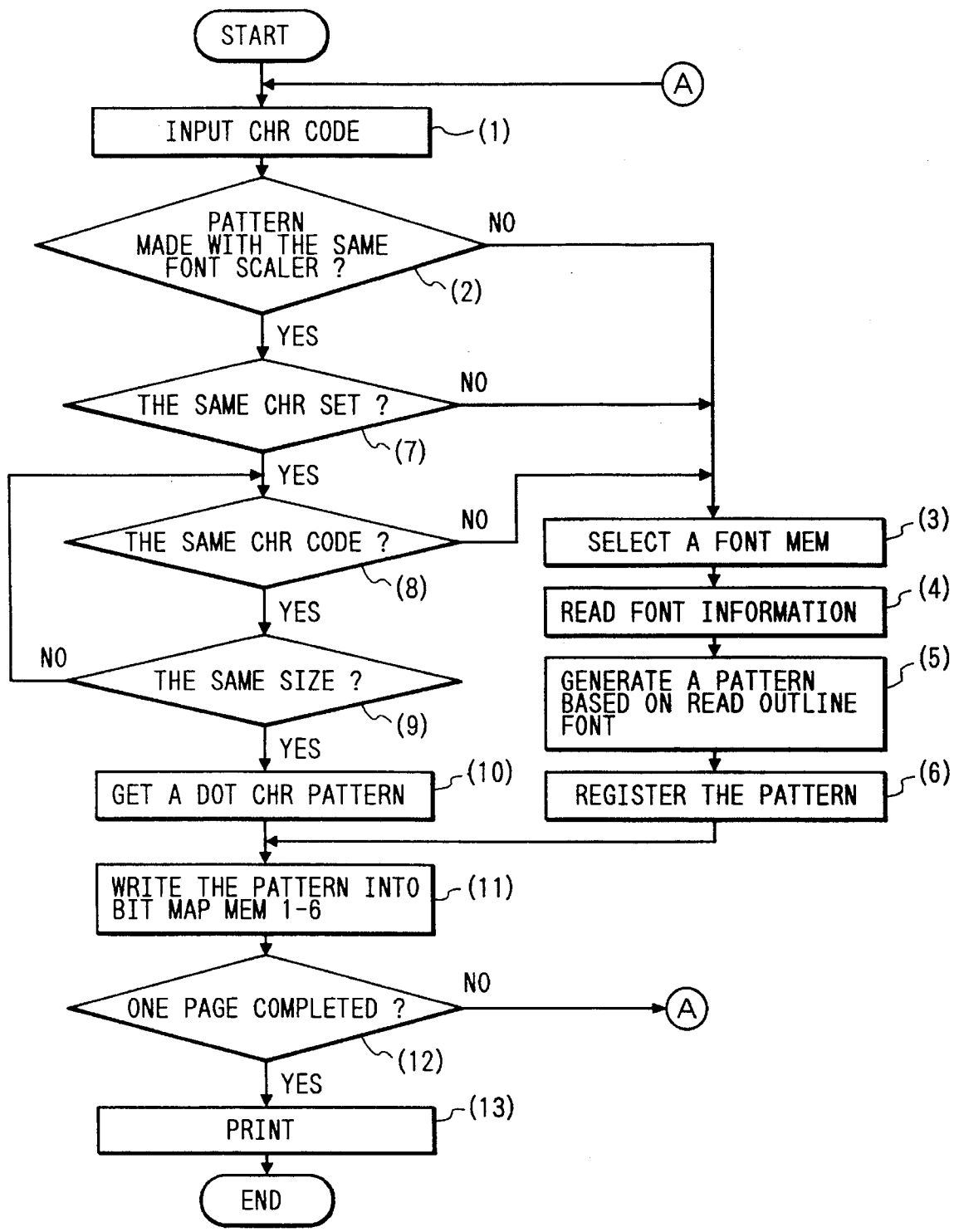
FIG. 5 is a flow chart showing an example of the first character pattern generating sequence in a character processing method embodying the present invention.

FIG. 5 is a flow chart showing an example of the first character pattern generating sequence in a character processing method embodying the present invention, wherein numbers (1)–(13) represent process steps. In this embodiment, it is assumed that data of a page are stored in the page buffer memory 1-5 prior to the start of this routine.

At first data (information) of a character is read from the page buffer memory 1-5 (step 1). Said information of a character contains the font scaler identifying information, character set identifying information, code information, and character form (size) information.

Then there is discriminated whether the character pattern generated by the same font scaler is stored, by referring to the information areas in the font cache memory 1-4 (step 2), and, if not stored, the first font scaler 1-2 or the second font scaler 1-3 is selected according to the font scaler information (step 3), and the font information is fetched (step 4). Then the font scaler designated in the step 1 is used to generate a character pattern (developed on the RAM 1-1*b*) from the read outline font (step 5), and said character pattern is registered in the cache memory 1-4 (step 6).

On the other hand, if the step 2 identifies the same font scaler information, there is discriminated whether a same character set is instructed (step 7), and, if NO, the sequence proceeds to the step 3 explained above. If YES, there is further discriminated whether a same character code is instructed (step 8), and, if NO, the sequence proceeds to the step 3 explained above, but, if YES, there is discriminated whether the character of a same size is instructed (step 9). If NO, the sequence returns to the step 8, but, if YES, namely if a same character code and a same size are detected, the corresponding character pattern is read from the font cache memory 1-4 (step 10) and is written into the bit map memory 1-6 (step 11). Then there is discriminated whether the bit map memory development of a page has been completed (step 12), and, if NO, the sequence returns to the step 1, but, if YES, the image data developed in the bit map memory 1-6 are transferred to the printer engine 1-7 for printing on the recording medium as the output 200 (step 13).

In the character process method of the present invention explained above, different character form information corresponding to a same character code are individually stored, and each character pattern generated according to said stored character form information, each character code, each character form information and information on each generating means are stored. Then said stored character code, character form information and information on the generating means are compared with those in the input print information, and the stored character pattern is read, based on the result of said comparison, under the control of control means, so that a desired character pattern can be read, even when character patterns of different forms are generated, with identification of the forms of the already stored character patterns.

[2nd embodiment]

Figure 6:
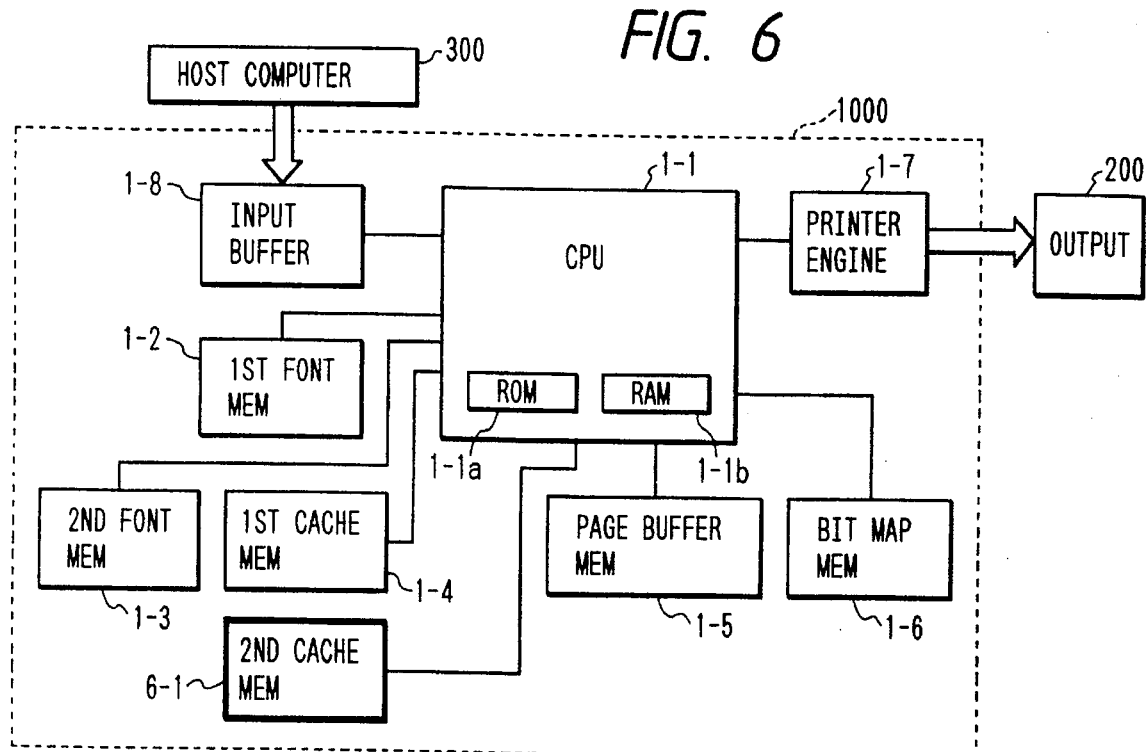
FIG. 6 is a block diagram of a character processing apparatus constituting a second embodiment of the present invention.

FIG. 6 is a block diagram showing the configuration of a character processing apparatus constituting a 2nd embodiment of the present invention, wherein same components as those in FIGS. 1 and 2 are represented by same numbers. This embodiment is provided with a second cache memory 6-1 as shown in FIG. 6, and is featured by a fact that, as shown in FIG. 7, the cache memory 1-4 is provided therein with a font scaler information area FS.

In FIG. 6 there is provided a 2nd cache memory 6-1 for storing character patterns generated from a second font memory 1-3.

Figure 7:
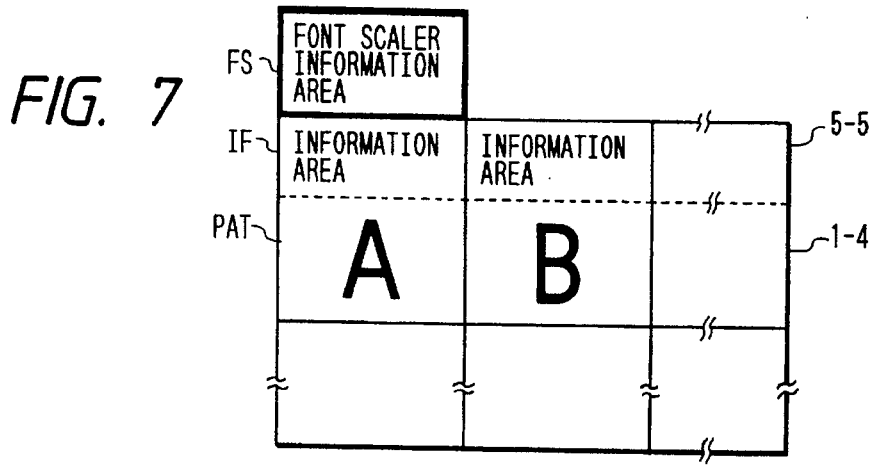
FIG. 7 is a schematic view showing the data storage state in a cache memory 104 shown in FIG. 6.
Figure 8:
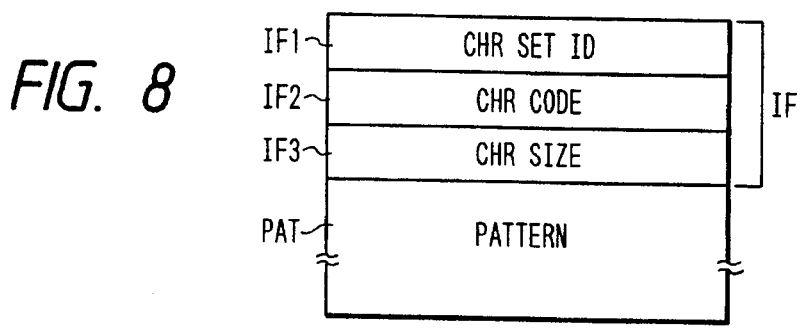
FIG. 8 is a view showing the data format of an information area IF and a pattern storage area PAT of the cache memory 104 shown in FIG. 7.

FIG. 7 is a schematic view showing the data storage state in the cache memory 1-4 shown in FIG. 6, and FIG. 8 is a view showing the data structure of the information area IF and the pattern area PAT of the cache memory 1-4 shown in FIG. 8, wherein same components as those in FIGS. 4 and 5 are presented by same symbols.

As shown in FIG. 7, the cache memory 1-4 is provided with a font scaler information area FS, independent from the information area IF.

In the following there will be explained, with reference to a flow chart shown in FIG. 9, a second character generating sequence in the character processing method of the present invention.

Figure 9:
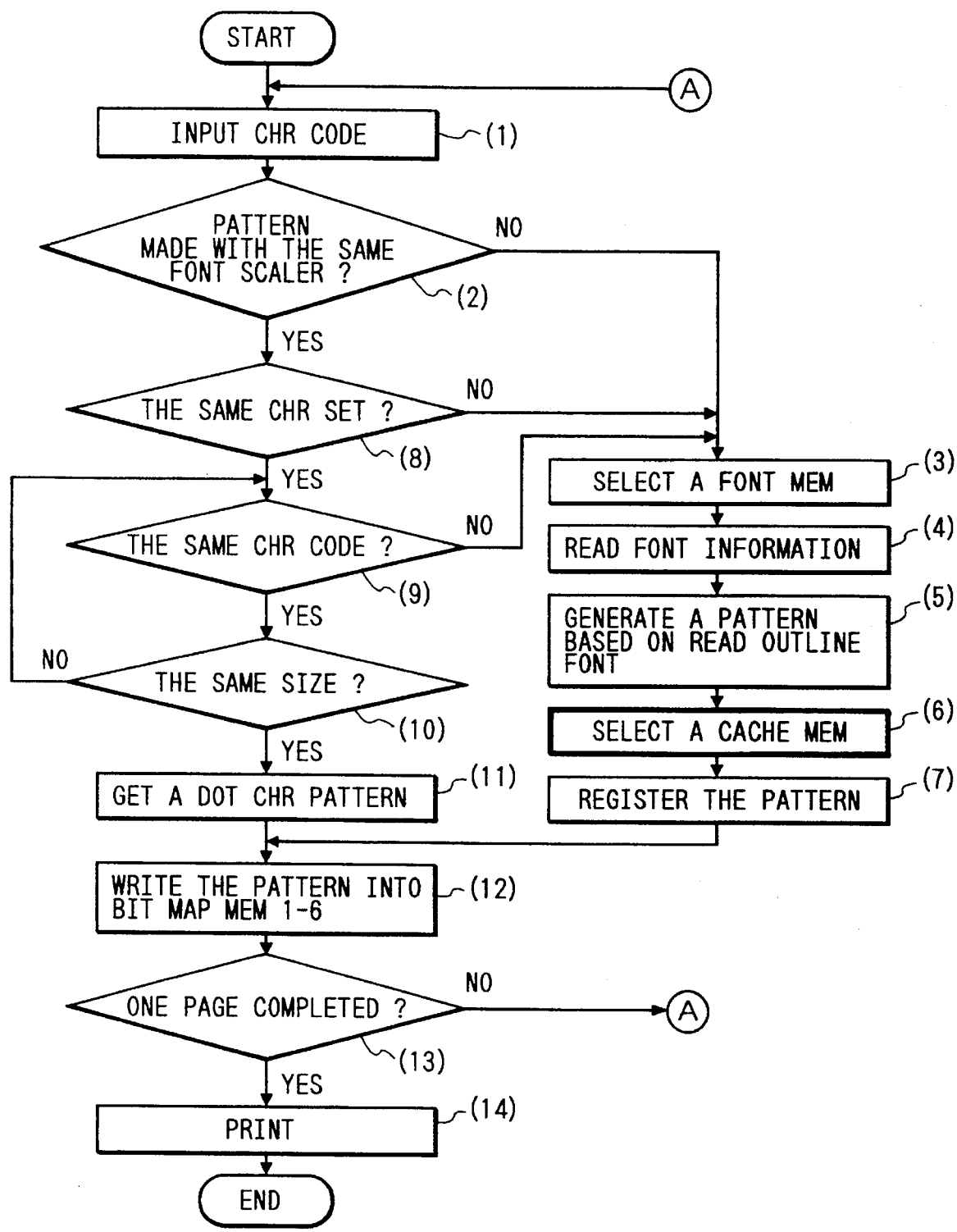
FIG. 9 is a flow chart showing an example of the second character pattern generating sequence in a character processing method embodying the present invention.

FIG. 9 is a flow chart showing an example of the second character pattern generating sequence in a character processing method embodying the present invention, wherein numbers (1) to (14) indicate process steps. In the present embodiment it is assumed that data of a page are already stored in the page buffer memory 1-5 prior to the start of this routine.

At first data (information) of a character are read from the page buffer memory 1-5 (step 1). Said information of a character contains the font scaler identifying information, the character set identifying information, the code information, and the character form (size) information.

Then there is discriminated whether a character pattern generated by a same font scaler has already been stored, by referring to the information areas in the font cache memory 1-4 (step 2), and, if not, the first font memory 1-2 or the second font memory 1-3 is selected according to the font scaler information (step 3), and the font information is fetched (step 4). Then the font scaler designated in the step 1 is used to generate a character pattern (developed on the RAM 1-1*b*), from the read outline font (step 5). Subsequently the cache memory 1-4 or 6-1 is selected for registering the character pattern, according to the designated font memory (step 6), and the registration is made in thus selected cache memory 1-4 or 6-1 (step 7).

On the other hand, if the step 2 identifies that the character pattern by the same font scaler has already been stored, there is discriminated whether it belongs to a same character set (step 8), and, if NO, the sequence proceeds to the step 2 mentioned above. If YES, there is further discriminated whether it is of a same character code, and, if NO, the sequence proceeds to the step 3 mentioned above, but if YES, there is further discriminated whether it is of a same character size (step 10). If NO, the sequence returns to the step 9, but, if YES, namely if a same character code and a same size are detected, the corresponding character pattern is read from the font cache memory 1-4 or the cache memory 6-1 (step 11) and stored in the bit map memory 1-6 (step 12). Then there is discriminated whether the bit map memory development of a page has been completed (step 13), and, if NO, the sequence returns to the step 1, but, if YES, the image data developed in the bit map memory 1-6 are transferred to the printer engine 1-7 for printing on the recording medium as the output 200 (step 14).

The above-explained embodiment is provided with two font memories storing outline fonts of different constituting methods, but it is also possible to incorporate an outline font in the recording apparatus and to load another outline font from the host computer 300, thereby enabling addition, modification or renewal of the outline font.

[3rd embodiment (conversion information being stored)]

Figure 10:
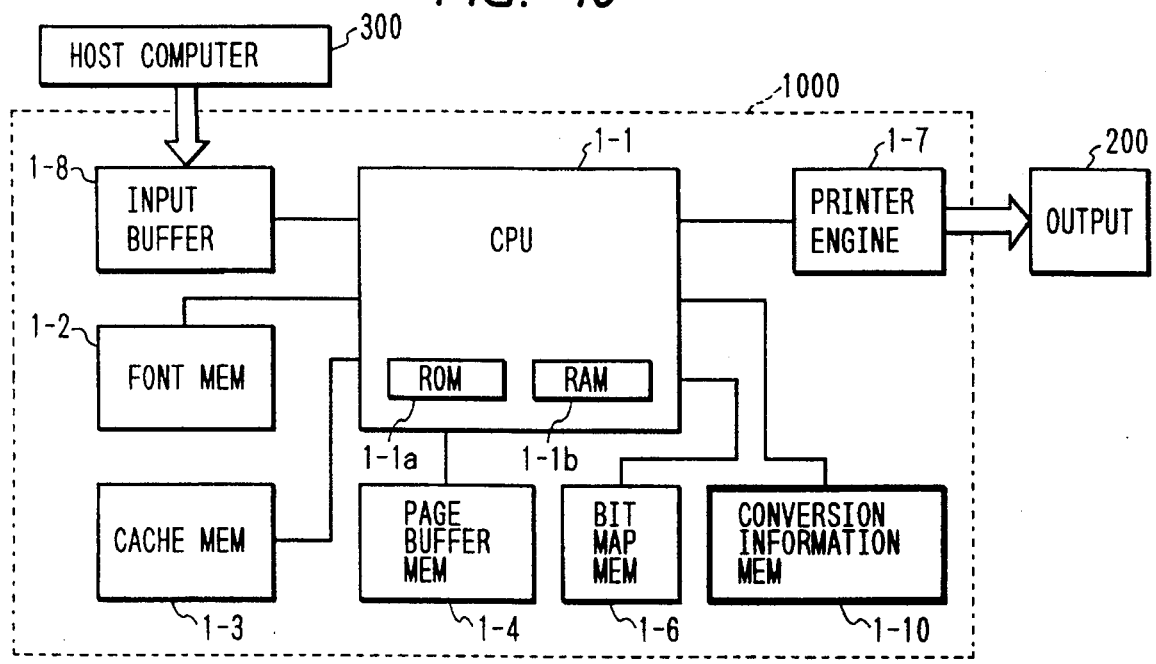
FIG. 10 is a block diagram of a character processing apparatus constituting a third embodiment of the present invention.

FIG. 10 is a block diagram showing the configuration of a character processing apparatus constituting a 3rd embodiment of the present invention, wherein same components as those in FIGS. 1 and 2 are represented by same numbers. In this embodiment, a conversion information memory 1-10 is provided as shown in FIG. 10.

Figure 11:
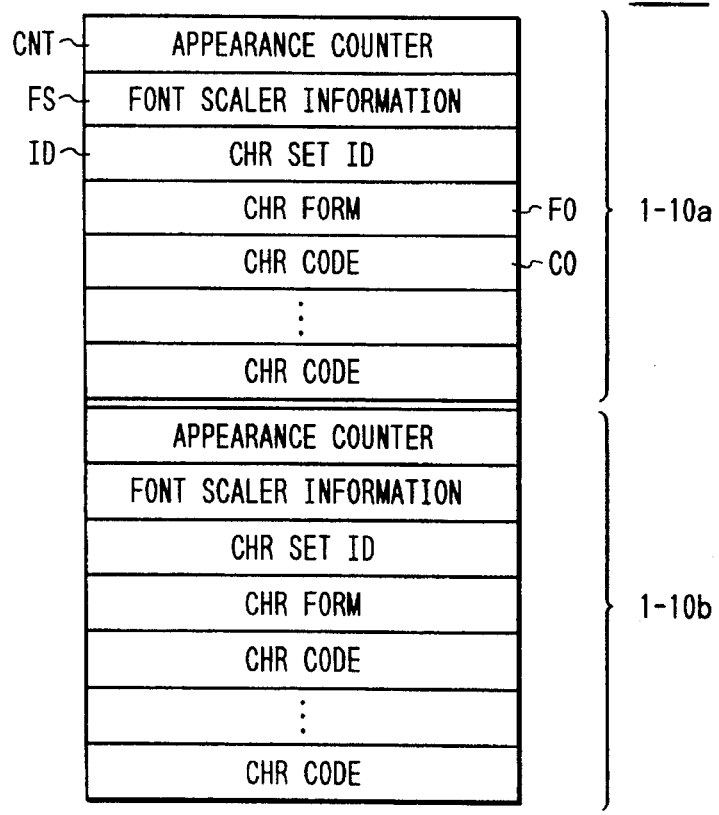
FIG. 11 is a view showing an example of the development information stored in a conversion information memory 1-10 shown in FIG. 10.

The conversion information memory 1-10 stores, for example as shown in FIG. 11, the conversion information for the character patterns to be generated in advance. The data stored in the cache memory 1-3 are same as those in FIGS. 3 and 4, and will not, therefore, be explained further.

In the above-explained character processing apparatus, when the generating means (achieved by the functions of the CPU 1-1) generate character patterns of different forms by referring to the character form information stored in the font memories 1-2, 1-3, and when each generated character pattern, the character form information of each character pattern, the information on the generating means for each character pattern and each character code are stored in generated pattern memory means, registration means (achieved by a function of the CPU 1-1) automatically registers, in generated pattern memory means (cache memory 1-3), each character pattern generated by each generating means based on predetermined conversion information stored in advance in the conversion information memory means (conversion information memory 1-10) and the predetermined conversion information corresponding to said character pattern, whereby the desired character patterns corresponding to each generating means can be registered in classified manner in the generated pattern memory means.

Also the selection means (selecting instruction from the host computer 300 in the present embodiment) selects the plural predetermined conversion information stored in classified manner in the conversion information memory means (conversion information memory 1-10), whereby the character patterns according to various conversion information can be registered in classified manner in the generated pattern memory means.

Also the modification means (achieved by a function of the CPU 1-1 in the present embodiment) modifies the predetermined conversion information stored in the conversion information memory means (conversion information memory 1-10), whereby the character pattern to be stored in the generated pattern memory means can therefore be modified.

Furthermore, predetermined conversion information, corresponding to the character patterns to be stored in advance in the generated pattern memory means (cache memory 1-3), are stored in the conversion information memory means (conversion information memory 1-10) together with the generated data, and the registration means (CPU 1-1) registers the character patterns generated by the generating means (achieved by their function of the CPU 1-1) according to said stored conversion information and the generated data, and the predetermined conversion information corresponding to said character patterns in the generated pattern memory means, according to the frequency of appearance thereof. It is thus rendered possible to preferentially register the character patterns of higher frequencies of appearance, corresponding to each generating means, in the generated pattern memory means.

FIG. 11 shows an example of the conversion information to be stored in the conversion information memory 1-10 shown in FIG. 10.

As shown in FIG. 11, the conversion information memory 1-10 stores, for each font scaler FS, the conversion information 1-10a, 1-10b for each set of an appearing counter CNT, a character set identifier ID, a character form FO and a character code CO.

In the following explained is the font pattern development into the font cache memory 1-3 shown in FIG. 10, with reference to a flow chart shown in FIG. 12.

Figure 12:
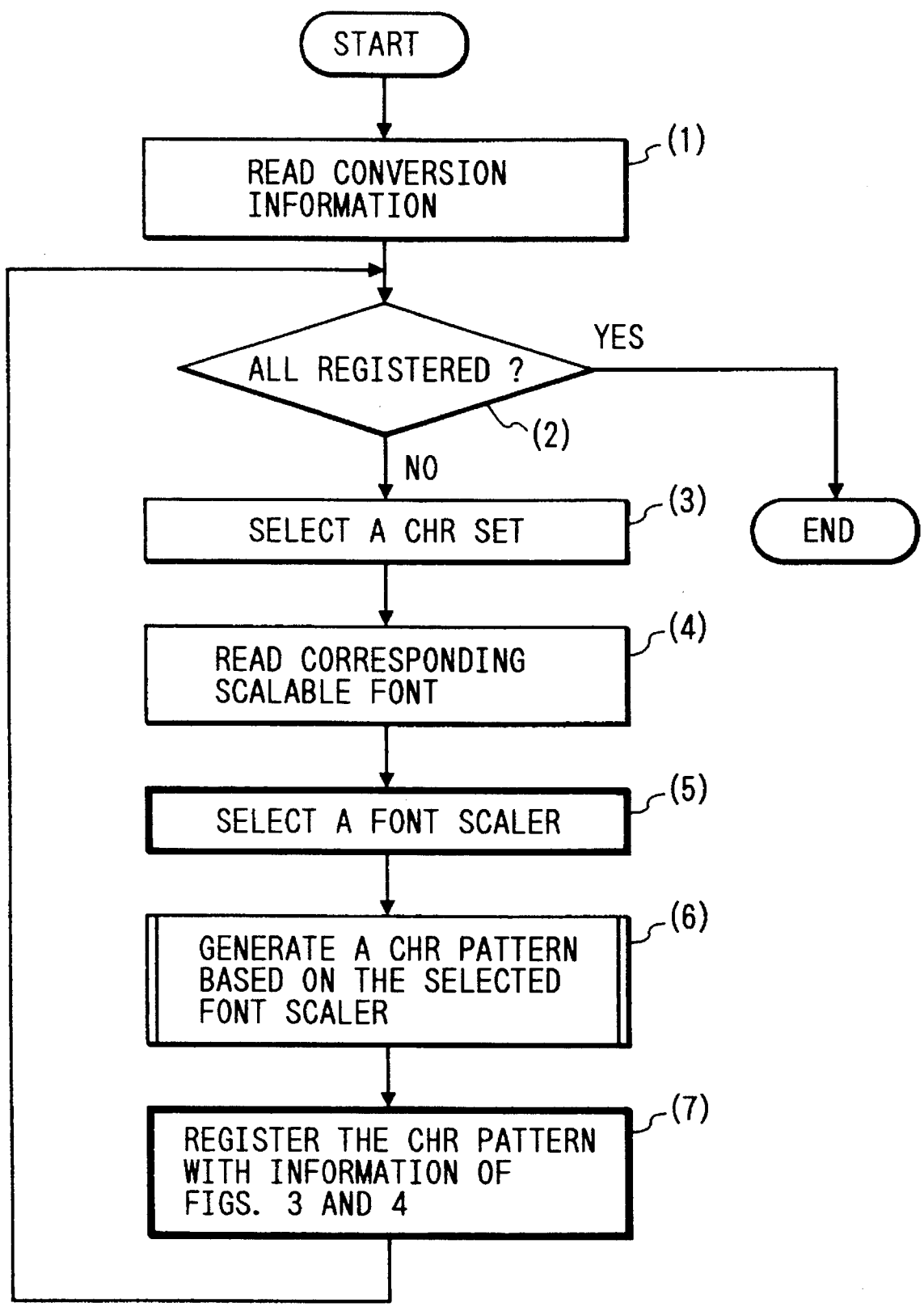
FIG. 12 is a flow chart showing an example of the first font pattern conversion/registration sequence in a character processing apparatus of the present invention.

FIG. 12 is a flow chart showing an example of a first font pattern conversion/registration sequence in a character processing apparatus of the present invention, wherein numbers (1) to (7) indicate process steps.

At first there are read information of the character patterns to be registered in advance, from the conversion information memory 1-10 (step 1), and there is discriminated whether all the character patterns have been registered (step 2). If YES, the sequence is terminated. If NO, there is selected a character set, according to the font scaler information FS and the character identification ID stored in the conversion information memory 1-10 shown in FIG. 11 (step 3). Subsequently a scalable font corresponding to said character set is read from the font memory 1-2 (step 4). Then the character pattern generating means is selected according to the font scaler information (step 5), and a character pattern is generated by the selected font scaler, according to the character form stored in the conversion information memory 1-10 (step 6). Subsequently the generated character pattern is registered in the font cache memory 1-3, together with the information shown in FIGS. 3 and 4, and the sequence returns to the step 2.

Figure 13:
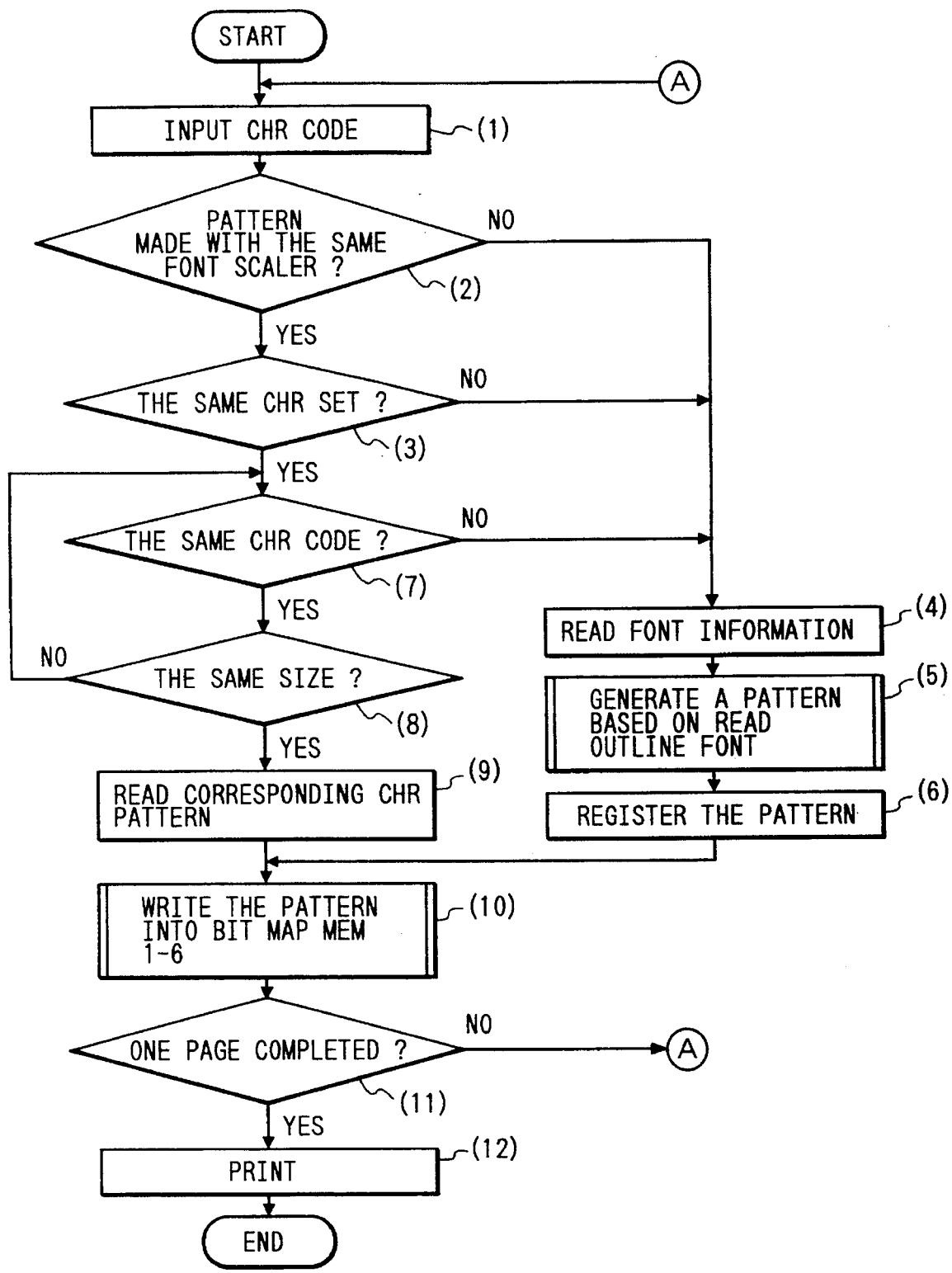
FIG. 13 is a flow chart showing an example of the third character pattern generating sequence in a character processing method embodying the present invention.

FIG. 13 is a flow chart showing an example of a third character pattern generating sequence in a character processing method embodying the present invention, wherein numbers (1) to (12) indicate the process steps.

In the present embodiment it is assumed that code data of a page have been stored in the page buffer memory 1-5 prior to the start of this routine.

At first data (information) of a character are read from the page buffer memory 1-5 (step 1). Said information of a character includes the font scaler information, the character set identifying information, the code information and the character form (size) information.

Then there is discriminated whether a character pattern generated by a same font scaler has already been stored, by referring to the information areas in the font cache memory (step 2), and, if not, the font information is fetched (step 4). Then the font scaler designated in the step 1 is used to generate a character pattern (developed on the RAM 1-1b), from the read outline font (step 5). Subsequently the character pattern is registered in the cache memory 1-4 (step 6) and the sequence proceeds to a step 10.

On the other hand, if the step 2 identifies that the character pattern by the same font scaler has already been stored, there is discriminated whether it belongs to a same character set (step 3), and, if NO, the sequence proceeds to the step 4 mentioned above. If YES, there is further discriminated whether it is of a same character code (step 7), and, if NO, the sequence proceeds to the step 4 mentioned above. If YES, there is discriminated whether it is of a same size (step 8), and, if NO, the sequence returns to the step 7, but, if YES, namely if a same character code and a same size are detected, the corresponding character pattern is read from the font cache memory 1-4 (step 9) and is stored in the bit map memory 1-6 (step 10). Then there is discriminated whether the bit map memory development of a page has been completed (step 11), and, if NO, the sequence returns to the step 1, but, if YES, the image data developed in the bit map memory 1-6 are transferred to the printer engine 1-7 for printing on the recording medium as the output 200 (step 12).

In this manner, the development of the character patterns in advance dispenses with the character conversion at the entry of the character code, thereby shortening the time required for the character conversion process and enabling high-speed printing process.

Figure 14:
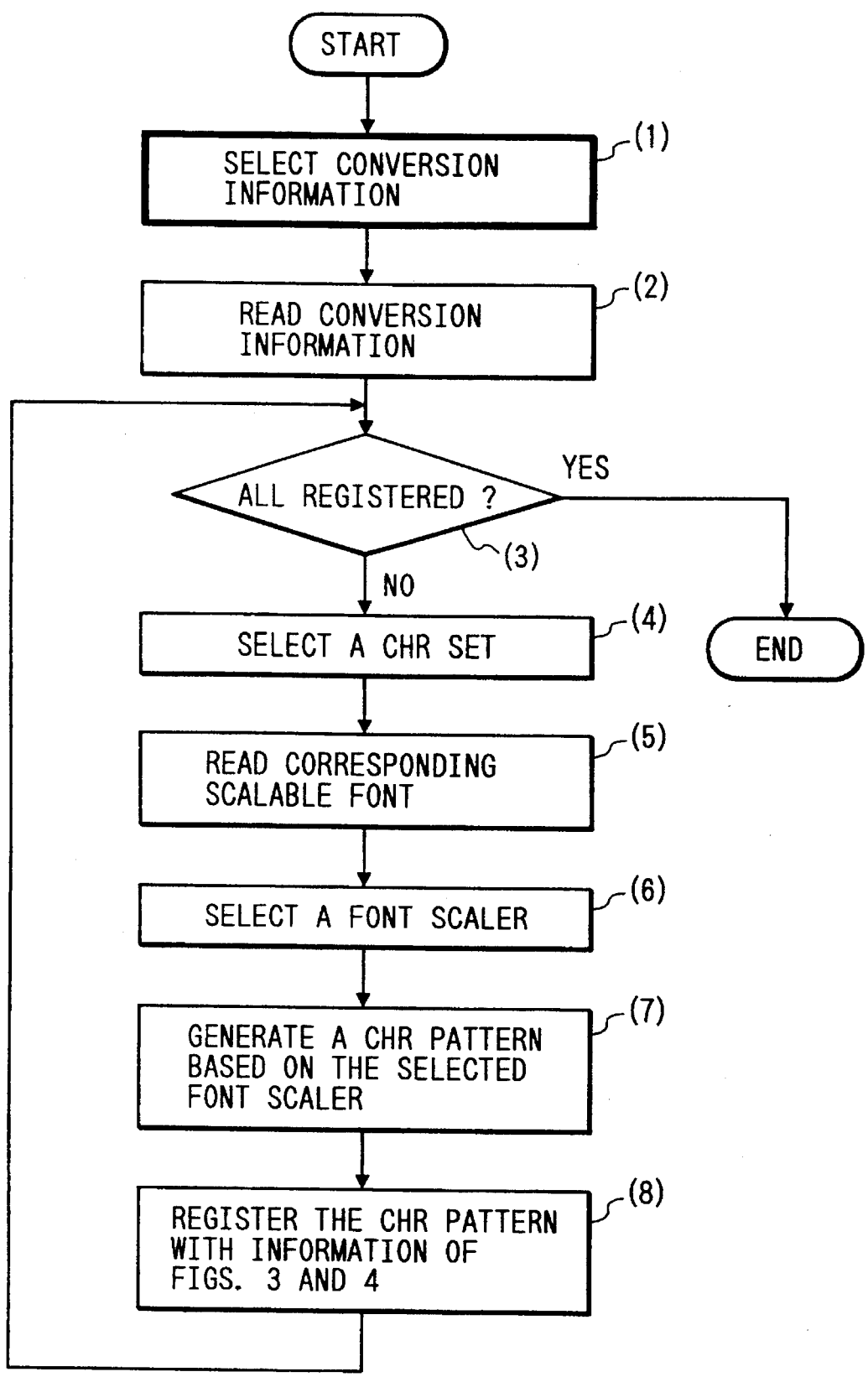
FIG. 14 is a flow chart showing an example of the second font pattern conversion/registration sequence in a character processing apparatus of the present invention.

FIG. 14 is a flow chart showing an example of the second font pattern conversion/registration sequence in a character processing apparatus of the present invention, wherein numbers (1) to (8) indicate process steps. In the present embodiment it is assumed that the conversion information memory 1-10 contains at least two sets of the conversion information 1, 2 as shown in FIG. 15.

At first, from the information of plural character patterns stored in the conversion information memory 1-10 and to be registered in advance in the cache memory 1-3, there is selected one indicated by a conversion information flag (step 1), which is designated by the operation panel attached to the apparatus or by a command from the host computer 300.

Then there is read information on the character patterns to be registered in advance, from the conversion information memory 1-10 (step 2), and there is discriminated whether all the registrations have been completed (step 3). If YES, the sequence is terminated, but, if NO, a character set is selected according the font scaler information FS and the conversion information ID stored in the conversion information memory 1-10 shown in FIG. 11 (step 4). Then a scalable font corresponding to said character set is read from the font memory 1-2 (step 5), the character pattern generating means is selected according to the font scaler information (step 6), and a character pattern is generated by the selected font scaler according to the character form stored in the conversion information memory 1-10 (step 7). The generated character pattern is registered in the font cache memory 1-3, together with the information shown in FIGS. 3 and 4 (step 8), and the sequence returns to the step 3.

In the above-explained embodiment, the conversion information flag is assumed to be designated for example from the operation panel, but it may also be automatically selected for example from the capacity of the font cache memory 1-3.

Also in case there are provided plural control languages for analyzing the control information entered from the host computer 300, it is also possible to have conversion information for each control language and to automatically recognize and select the conversion information corresponding to each control language.

Also in a recording apparatus in which the resolving power of the printer engine 1-7 is switchable, the apparatus may be so constructed as to automatically select the conversion information matching each resolving power.

In the above-explained embodiment the conversion information memory 1-10 shown in FIG. 11 is composed of an ordinary RAM, it may also be composed of a non-volatile memory, of which content may be rewritten by instructions from the operation panel 1501 shown in FIG. 1 or from the host computer 300. In such case the font scaler information, the character set identifier, the character size and the character code may be designated singly or in combination at a time.

Also the data stored in the conversion information memory 1-10 shown in FIG. 11 consists of the font scaler information, the character set identifier, the character size and the character code, but such combination is not limitative. For example the font scaler information alone may be stored, or it may be suitably combined with other data.

Also the character codes need not be selected in a mere train of codes but may be selected in a combination of character codes frequently used in certain documents, such as for medical use, scientific use, general business use or seasonal greeting use, and the designation of codes may be done in such combination only.

Also in the above-explained embodiment, the character patterns are developed in advance in the cache memory 1-3, based on the conversion information stored in the conversion information memory 1-10, but it is also possible, as shown in the ensuing embodiments, to preferentially develop the frequently used character patterns in said cache memory 1-3.

[4th embodiment]

FIG. 14 is a flow chart showing an example of the 4th character pattern generating sequence, in a character processing method of the present invention, wherein numbers (1) to (13) indicate process steps.

At first data (information) of a character is read from the page buffer memory 1-5 (step 1). Said information of a character contains the font scaler information, the character set identifying information, the code information and the character form (size) information.

Then there is discriminated whether a character pattern generated by the same font scaler has already been stored, by referring to the information areas in the font cache memory 1-4 (step 2), and, if not, the font information is fetched (step 4). Then a character pattern is generated (developed on the RAM 1-1b) from the outline font read by the font scaler designated in the step 1 (step 5), and is registered in the cache memory 1-4 (step 6).

On the other hand, if the step 2 identifies the same font scaler information, there is discriminated whether a same character set is instructed (step 3), and, if NO, the sequence proceeds to the step 4 mentioned above. If YES, there is further discriminated whether a same character code is instructed (step 7), and, if NO, the sequence proceeds to the step 4. If YES, there is discriminated whether a same character size is instructed, and, if NO, the sequence returns to the step 7. If YES, namely if a same character code and a same size are detected, a corresponding character pattern is read from the font cache memory 1-4 (step 9), then executed is a conversion information registering routine for registering the conversion information of the character pattern registered in the step 6 or the information part (conversion information) of the character pattern read from the font cache memory 1-3 in the step 9 into the conversion information memory 1-10 (step 10), and there is executed an increment of the appearance number counter. In this manner the frequency of appearance is counted.

Subsequently said character pattern is written into the bit map memory 1-6 (step 11). There is discriminated whether the bit map memory development of a page has been completed (step 12), and, if NO, the sequence returns to the step 1, but, if YES, the image data developed in the bit map memory 1-6 are transferred to the printer engine 1-7 for printing on the recording medium as the output 200 (step 13).

By converting the character patterns of high frequency in advance, the conversion is no longer required at the entry of the corresponding character codes, so that the printing process can be made at a higher speed.

Figures 15A, 15B, 17:
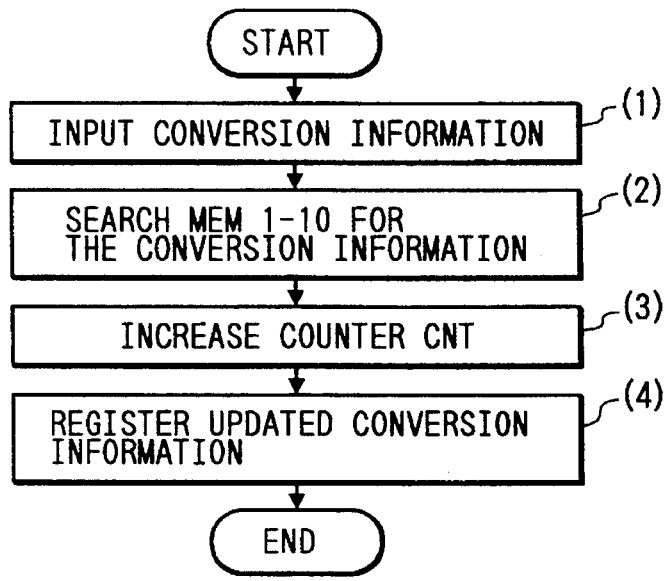
FIGS. 15A and 15B are views showing an example of conversion information in a character processing apparatus of the present invention.
FIG. 17 is a flow chart showing an example of the detailed sequence of a converted information registration routine shown in FIG. 16.

FIG. 17 is a flow chart showing an example of the conversion information registering routine shown in FIG. 16, wherein numbers (1) to (4) indicate the process steps.

When the conversion information consisting of the font scaler information, the character set identifier, the character size and the character code is entered (step 1), there is conducted a search, in the conversion information memory 1-10, for a same combination of the font scaler information, the character set identifier and the character size (step 2). If said search indicates the absence of the conversion information in the conversion information memory 1-10, there is increased an appearance number counter corresponding to the conversion information, in order to additionally register the conversion information of said character pattern (step 3). Said appearance number counter is provided for each combination of the font scaler information, the character set identifier and the character size. More specifically a counter is provided for each combination of the style and size, such as the Ming style with a dot size of 50×50, the Gothic style with a dot size of 50×50 or the Ming style with a dot size of 40×40, and the count is increased at each entry of the character code of said style and size. The count may also be stored for example in the RAM 1-1b.

Then thus counted conversion information is registered in the conversion information memory 1-10, composed of a non-volatile memory (step 4), and the sequence is terminated.

It is therefore rendered possible, for example in the step 1 of the character pattern selection/registration sequence shown in FIGS. 15A and 15B, to investigate the contents of the appearance number counters stored in the conversion information memory 1-10, to read the conversion information of the highest frequency of appearance, and, according to said conversion information, to preferentially develop the character pattern of the high frequency of appearance in the cache memory 1-3.

In the above-explained embodiment, the conversion information is registered in the conversion information memory 1-6 at each reception of the character code as shown in FIGS. 16 and 17, but it is also possible to prepare a conversion information table in the RAM 1-1b and to re-write the conversion information memory 1-6 with the character patterns of highest frequencies of appearance, for example at a regular interval.

In such case the counters for the number of appearance may be dispensed with in the conversion information memory 1-10.

Also in the foregoing embodiment there has been explained the routine of converting the character patterns in advance as shown in FIGS. 12 and 14, but said routine may be started at any time, for example whenever the print data are not received from the host computer 300, whereby the character pattern conversion at the start of the next printing operation can be made more efficient.

Also in the above-explained embodiment the character dot pattern generated in advance is stored in the cache memory 1-3 composed for example of a RAM, but it may also be composed of a non-volatile memory or a secondary memory device.

Figure 18:
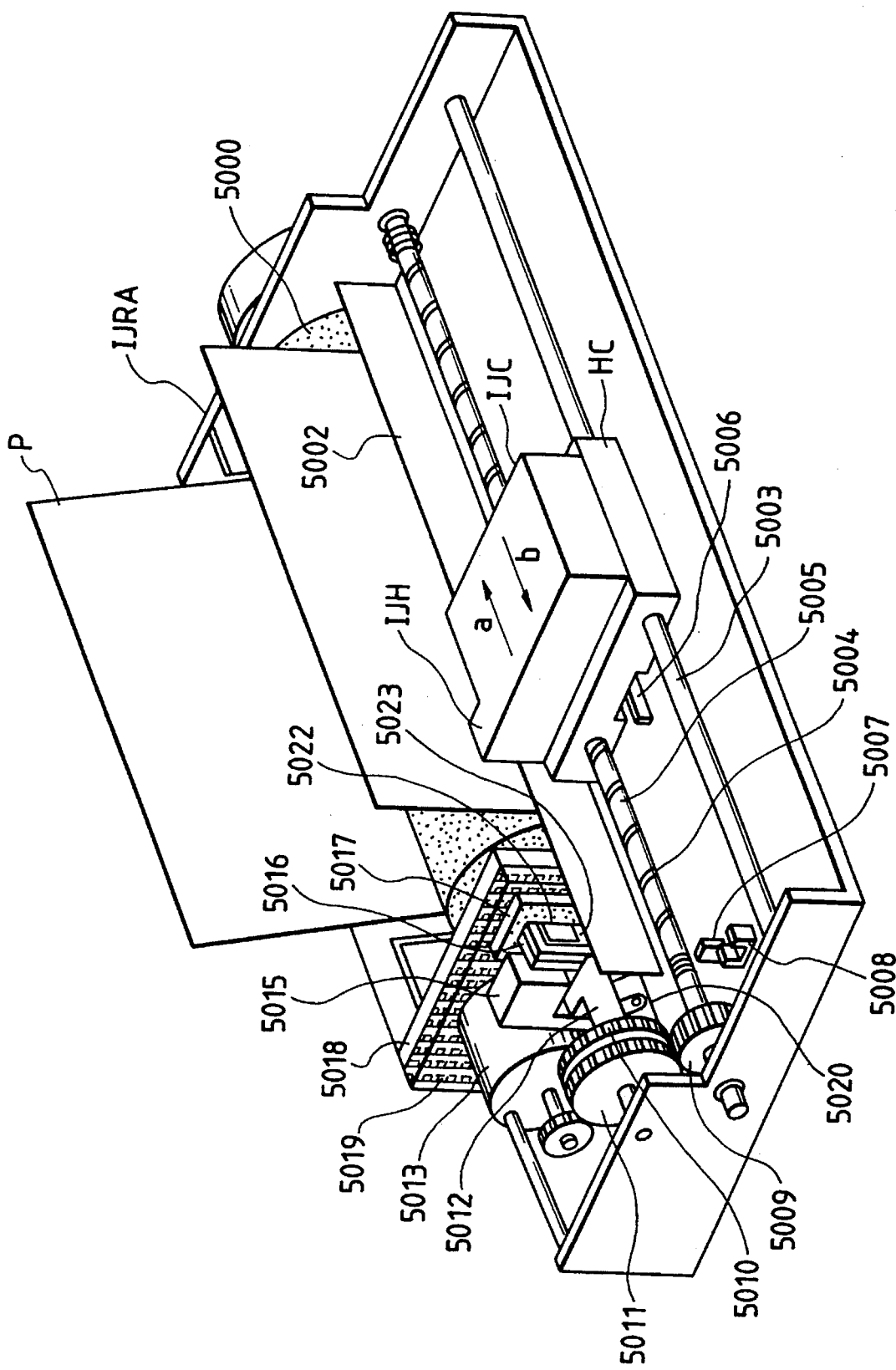
FIG. 18 is a perspective view of another recording apparatus in which the present invention is applicable.

FIG. 18 is a perspective view of another recording apparatus, for example an ink jet recording apparatus, in which the present invention is applicable.

A carriage HC is provided with a pin (not shown) engaging with a spiral groove 5004 of a lead screw 5005, which is linked with a motor 5013 through transmission gears 5011, 5009 and is reciprocated in directions a, b by the forward or reverse rotation of said motor. Said carriage HC supports an ink jet cartridge IJC loaded thereon. A paper pressure plate 5002 presses paper to a platen 5000, over the moving direction of the carriage. A photocoupler 5007, 5008 functions as home position detecting means for confirming the presence of a lever 5006 of the carriage HC in the position of said detecting means, thereby switching the direction of rotation of the motor 5013. A member 5016 supports a cap member 5022 for capping the entire face of a recording head, and suction means 5015 is provided for achieving suction inside said cap and effecting the recovery of the recording head by suction. A cleaning blade 5017 can be moved frontward and backward by a member 5019. A supporting plate 5018 supports said cleaning blade 5017 and the member 5019. A lever 5012 for initiating the recovery operation by suction is moved by the movement of a cam 5020 engaging with the carriage HC, whereby the driving force of the motor 5013 is controlled by known transmission means such as a clutch.

These capping, cleaning and recovering operations are executed by the function of the lead screw 5005 when the carriage HC is brought to the home position area, but these operations may be conducted at any known timings in any known manner.

In such recording apparatus as explained above, when the recording information is entered from the host computer through an unrepresented interface, the conversion information of the character patterns is controlled in the aforementioned manner, whereby the character pattern development is enabled utilizing the font cache memory from the start of the printing operation, and the time required before the start of printing can be significantly reduced in comparison with the conventional art.

As detailedly explained in the foregoing, the present invention can provide an image output method of generating in advance patterns corresponding to predetermined codes and storing said patterns in a memory, prior to the input of a code as image information, and utilizing a pattern corresponding to the input code, thereby shortening the time required for conversion of the input code and increasing the process speed, and an apparatus adapted for executing such method.

Also as explained in the foregoing, the present invention can provide an image output method of converting, in advance, code information stored in conversion information memory means into a pattern according to form information stored in conversion information memory means, then registering said pattern in pattern memory means, and, in response to input data of which code information and form information coincide with those registered in the pattern memory means, effecting conversion of said input data into pattern utilizing the conversion information registered in the pattern memory means, and an apparatus adapted for executing such method.

Furthermore, the present invention can provide an iamge output method of storing identification data for identifying plural font scalers, together with the generated character pattern and the character conversion information, thereby reading a character pattern corresponding to each font scaler, and an apparatus adapted for executing such method.

Furthermore, the present invention can provide an image output method of individually storing different character form information corresponding to a same character code, also storing each character pattern generated according to said stored character form information, each character code, each character form information and information on each generating means, then comparing said stored character code, character form information and information on the generating means with those in the input print information and reading the stored character pattern based on the result of said comparison, and an apparatus adapted for executing such method.

The present invention can furthermore provide an image output apparatus comprising selection means for selecting predetermined plural conversion information stored in classified manner in conversion information memory means, and/or modification means for modifying predetermined conversion information stored in the conversion information memory means.

Furthermore the present invention can provide an image output method of individually storing different character form information corresponding to a same character code, also storing each character pattern generated according to said stored character form information, each character code, each character form information and information on each generating means, then comparing said stored character code, character form information and information the generating means with those in the input print information and reading the stored character pattern based on the result of said comparison, under the control of control means, whereby the readout of a desired character pattern can be attained, even in case of generating a character pattern of a different form, with identification of the form of the already stored character pattern, and an apparatus adapted for executing such method.

Furthermore the present invention can provide an image output method which comprises, when each generating means generates a character pattern of a different form by referring to each character form information stored in each font memory, storing each generated character pattern, the character form information of each character pattern, the information on the generating means for each character pattern and each character code in generated pattern memory means, then comparing the character code, the character form information and the information on the generating means in the input print information with those stored in said generated pattern memory means, and controlling the readout of each character pattern from said generated pattern memory means by control means, whereby the readout of a desired character pattern can be attained, even in case of generating a character pattern of a different form, with identification of the form of the already stored character pattern, and an apparatus adapted for executing such method.

Furthermore the present invention can provide an image output method in which, when each generating means generates a character pattern of a different form by referring to each character form information stored in each font memory and each generated character pattern, the character form information of each character pattern, the information on the generating means for each character pattern and each character code are stored in generated pattern memory means, registration means automatically registers each character pattern generated by each generating means based on predetermined conversion information stored in advance in conversion information memory means and predetermined conversion information corresponding to each character pattern, in generated pattern memory means, whereby the desired character patterns corresponding to different generating means can be registered in classified manner in the generated pattern memory means, and an apparatus adapted for executing such method.

Furthermore the present invention can provide an image output method of individually storing different character form information corresponding to a same character code, also storing each character code generated according to said stored character code information, each character code, each character form information and the information on each generating means, then comparing said stored character code, character form information and information on the generating means with those in the input print information, and reading the stored character pattern based on the result of said comparison under the control of control means, whereby the readout of a desired character pattern can be attained, even in case of generating a character pattern of a different form, with identification of the form of an already stored character pattern, and an apparatus adapted for executing such method.

Furthermore the present invention can provide an image output method capable of selecting predetermined conversion information of plural kinds stored in conversion information memory means, and registering character patterns, corresponding to different conversion information, in generated pattern memory means in classified manner, and an apparatus adapted for executing such method.

As explained in the foregoing, the present invention enables to read a character pattern corresponding to each font scaler and to register the character patterns to be used in selective manner, thereby providing an excellent effect of easily realizing a character cache process optimum for the situation of use of characters in the recording apparatus.

[5th embodiment]

In the following there will be explained still another preferred embodiment of the present invention, with reference to the attached drawings. The configuration of this embodiment is same as that of the 3rd embodiment shown in FIG. 10.

Figure 19:
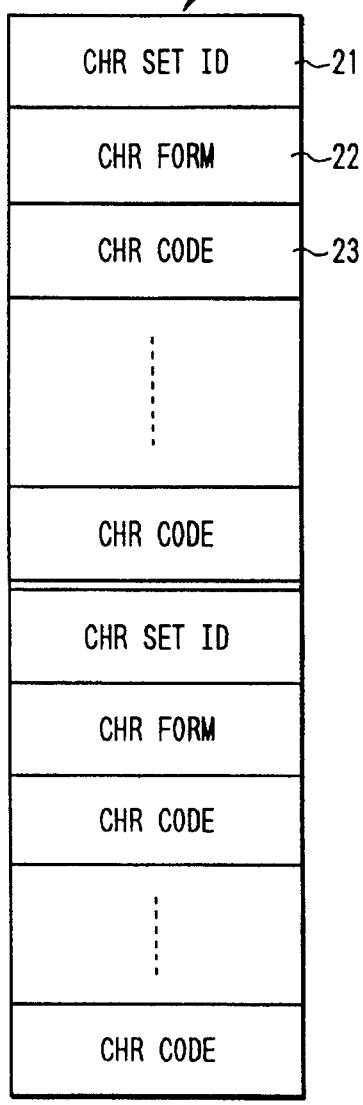
FIG. 19 is a view showing data format in a converted information memory in an embodiment 5.

FIG. 19 shows the data storage state in the conversion information memory 1-10 in this 5th embodiment, wherein a character set identifier 21 (indicating the character style such as Gothic), a character form 22 (width, height and information such as character rotation), and a group of character codes to be converted in advance, are stored as a combination.

Figure 20:
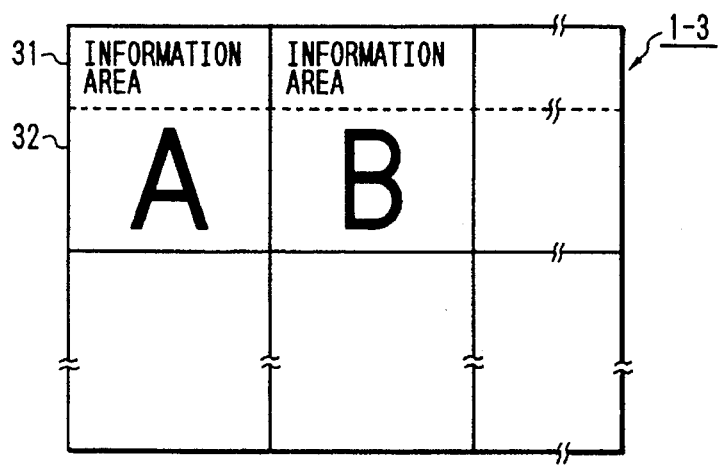
FIG. 20 is a view showing the data areas in a font cache memory.

FIG. 20 shows the data storage state in the cache memory 1-3 in the present embodiment. As shown in FIG. 20, the cache memory is composed of a pattern area 32 for storing the generated character pattern, and an information area 31 for storing the character form information etc. at said generation.

Figure 21:
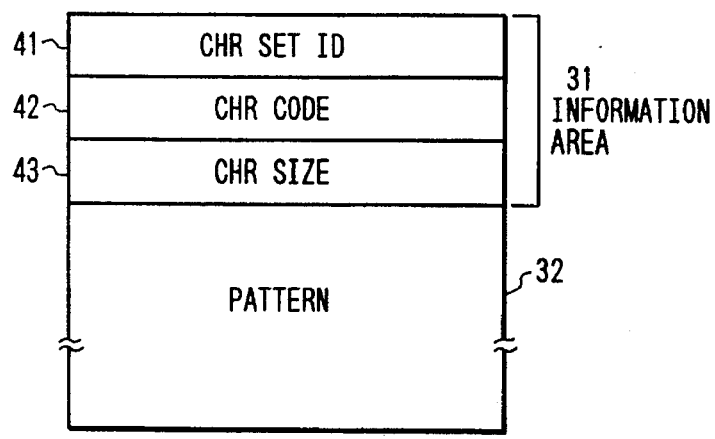
FIG. 21 is a view showing the data format in the font cache memory.

FIG. 21 shows the details of the registration area for a character pattern. The information area 31 stores a character set identifier 41 (representing the character style such as Gothic), a character code 42 of the registered character, and a size 43 (width and height) of the character pattern.

The data processing operation in this embodiment is conducted in the following manner.

Figure 22:
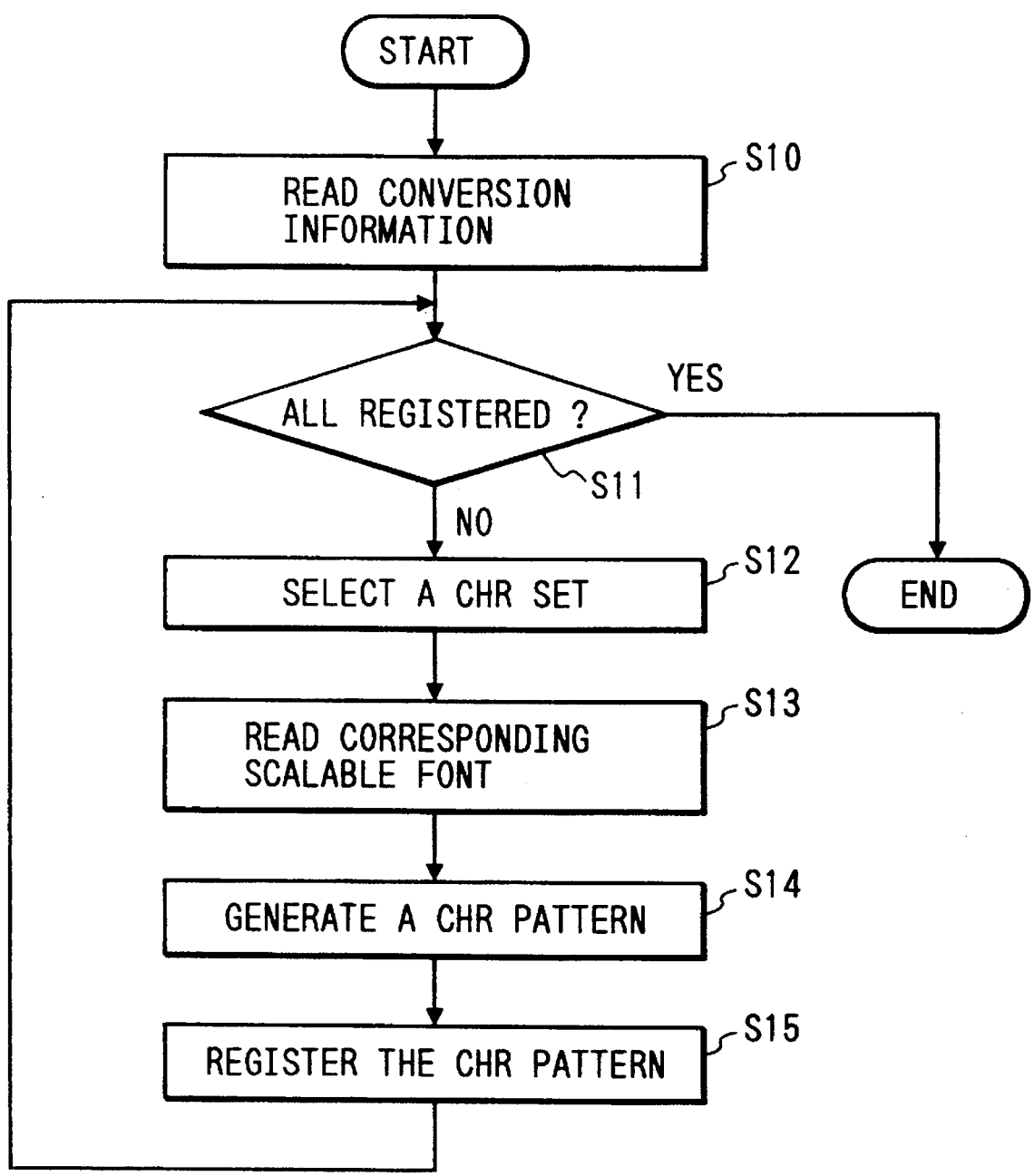
FIG. 22 is a flow chart showing the sequence of the character pattern registration into the font cache memory.

FIG. 22 is a flow chart showing the sequence of storing character patterns in advance in the font cache memory 1-3, utilizing the information stored in the conversion information memory 1-10 shown in FIG. 19.

At first a step S10 reads the information of the character patterns to be registered in advance, stored in the conversion information memory 1-10. Then a step S11 discriminates whether all the registrations have been completed, and, if not, a step S12 selects a character set according to the conversion information. Then a step S13 reads, from the font memory 1-2, a scalable font corresponding to the character codes of said character set, then a step S14 generates a character pattern according to the character form information stored in the conversion information memory 1-10, and a step S15 registers the information of the information area 31 and the pattern area 32 of the generated character pattern in the font cache memory 1-3. Then the sequence returns to the step S11 and repeats the above-explained process for all the character codes stored in the conversion information memory 1-10.

Figure 23:
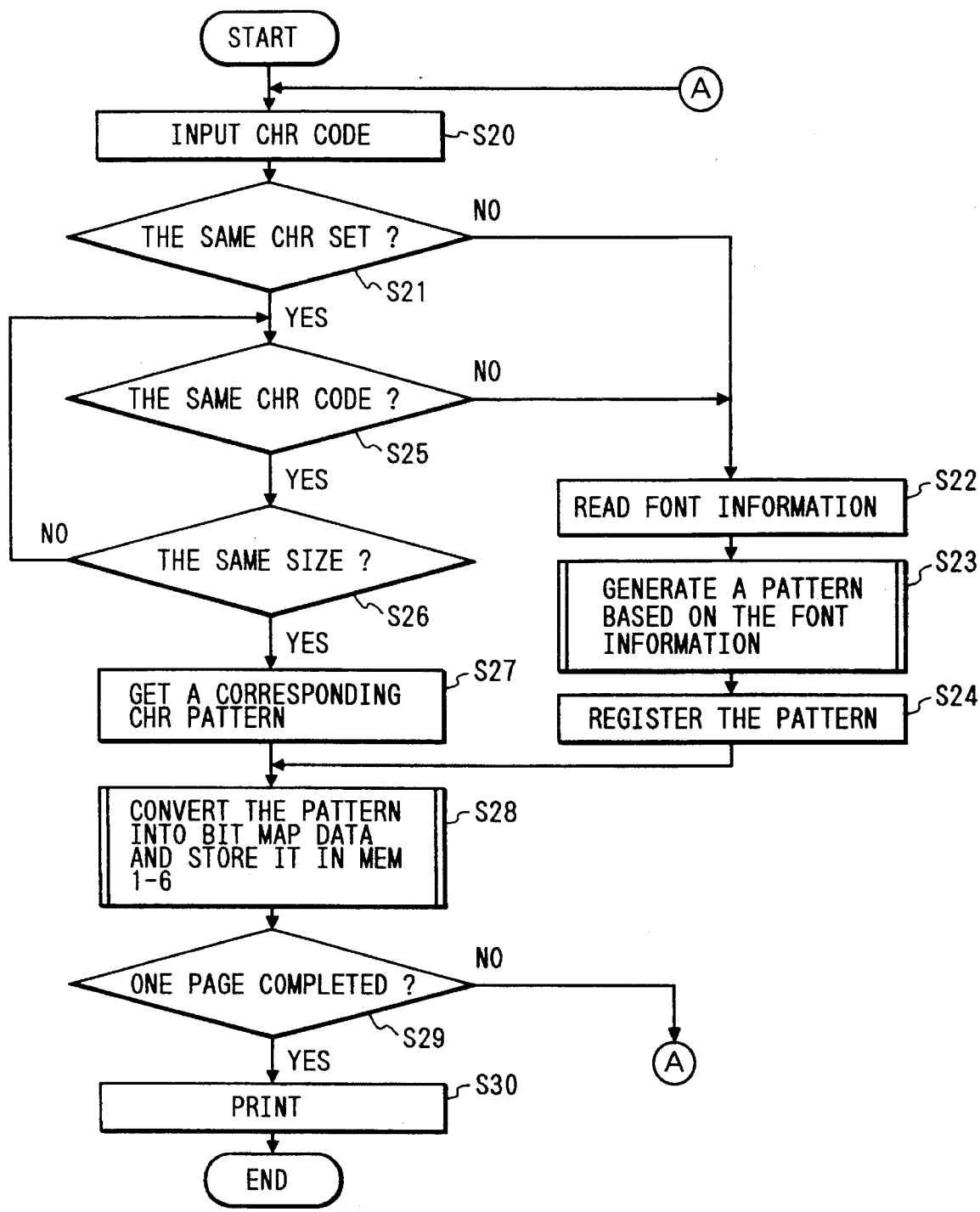
FIG. 23 is a flow chart showing the printing sequence.

FIG. 23 is a flow chart showing the printing sequence when image information composed of character codes from the host computer 300. It is assumed that data of a page are stored in the page buffer memory 1-4, prior to the start of this routine.

At first a step S20 reads a character code from the page buffer memory 14, and a step S21 discriminates whether a same character set is already stored, by referring to the character set identifiers in the information areas of the font cache memory 1-3.

If the same character set is not stored, a step S22 reads the corresponding font information from the font memory 12, then a step S23 generates a character pattern (developed on the RAM 1-1b), based on said font information, and a step S24 registers the generated character pattern in the font cache memory 1-3.

On the other hand, if the step S21 identifies the presence of a same character set, the sequence proceeds to a step S25 for discriminating whether it is of a same character code, by referring to the information area 31 in the font cache memory 1-3, and, if the same character code is present, a step S26 discriminates whether it is of a same character size, by referring to the information area 31 of the font cache memory 1-3. If the character code of same character code and same size is identified not registered by said steps S25 and S26, the steps S22 to S24 are executed to generate and register a character code anew. On the other hand, if same character code and size are detected in the steps S25 and S26, a step S27 reads the corresponding character pattern from the font cache memory 1-3.

Thus obtained character pattern is developed into a bit map pattern in a step S28 and is written into the bit map memory 1-6.

A step S29 discriminates whether the conversion of input data of a page has been completed, and, if not, the sequence returns to the step S20 for repeating the above-explained process. When the conversion of a page is completed, a step S30 transfers the image data from the bit map memory 1-6 to the printer engine 1-7 in succession, thereby effecting the printing operation.

As explained in the foregoing, the present 5th converters the font data into the character patterns in advance, thereby dispensing with the conversion into the character pattern at the input of the character code, and increasing the speed of the printing process. Also for a character code which has not been converted in advance, there is executed an additional registration of the character pattern, and the conversion into the character pattern can be dispensed with for the second or subsequent input of said character code, whereby the processing speed can be increased.

Also in the above-explained 5th embodiment, there can be provided plural conversion information by constituting the conversion information memory 1-10 with a non-volatile memory, and it is also possible, in such case, to select one of such conversion information by the operation panel 1501 or by an instruction from the host computer 300.

With respect to the character codes in the conversion information memory 1-10, it is also possible, instead of merely selecting a series of codes, to store combinations of character codes of high frequency of use for certain categories of documents, such as those for medical field, scientific field, general business use or seasonal greetings, and to designate such category of documents.

[6th embodiment]

Figure 24A:
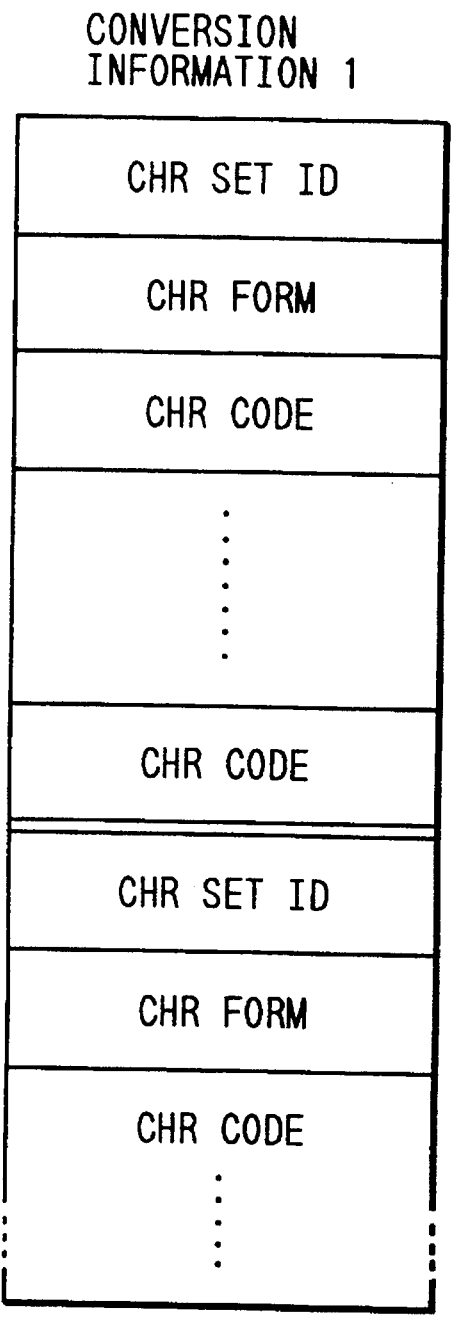
FIGS. 24A and 24B are views showing the data format in the converted information memory in an embodiment 6.
Figure 24B:
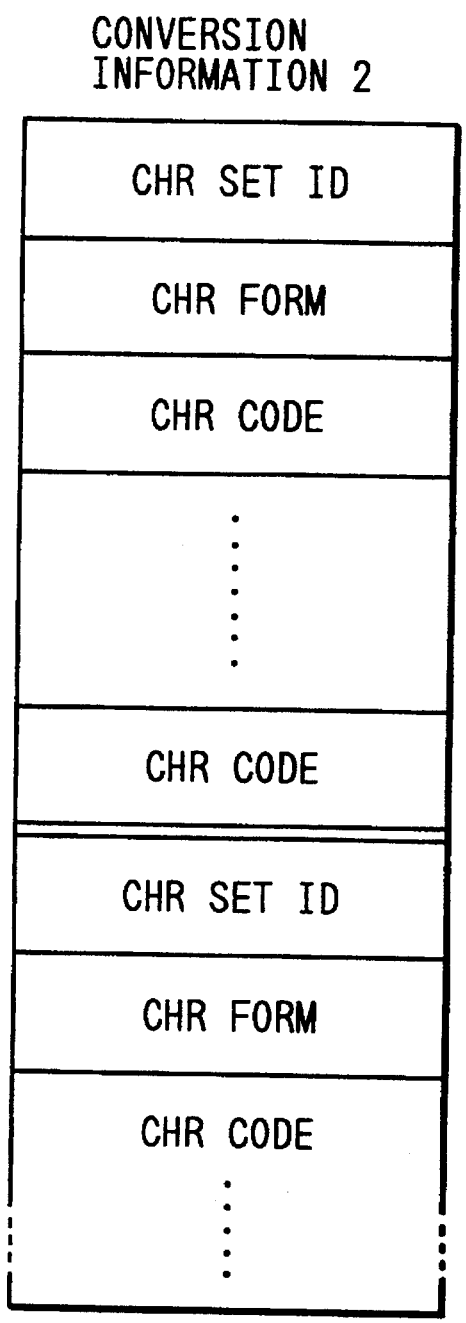

FIGS. 24A and 24B are views showing the data structure of the conversion information memory in a 6th embodiment, wherein said memory has two conversion information (conversion information 1 and 2).

FIG. 25 shows another process for storing the character patterns in the font cache memory 1-3 in advance. In this case there are provided at least two sets of conversion information as shown in FIG. 24.

At first a step S40 selects, among the plural conversion information, stored in the conversion information memory 1-10, of the character patterns to be registered in advance, one indicated by a conversion information flag, which is set by the operation panel 1501 of the apparatus of by a command from the host computer 300. Then a step S41 reads the selected conversion information, whereby the character pattern to be registered in advance is determined.

A step S42 discriminates whether all the conversion information read in the step S41 have been registered in the font cache memory 1-3, and, if not, a step S43 selects a character set according to the conversion information. Then a step S44 reads, from the font memory 1-2, a scalable font corresponding to the character code of said character set, and a step S45 generates a character pattern according to the character form stored in the conversion information memory 1-10. Then a step S46 registers the character pattern, generated in the step S45, in the font cache memory 1-3, according to the format shown in FIG. 21. Then the sequence returns to the step S42 until the above-explained sequence is executed for all the character codes stored in the conversion information memory 1-10.

The conversion information flag, used at the selection of the conversion information in the step S40 need not necessarily be set by the operation panel 1501 as explained above but can also be automatically set within the apparatus so as to select the conversion information, for example, according to the capacity of the font cache memory 1-3.

Also in an apparatus provided with plural control languages for analyzing the control information entered from the host computer, it is also possible to have conversion information for each control language and to automatically recognize and select the conversion information corresponding to the control language.

Also in an apparatus capable of switching the resolving power of the printer engine, there may be provided a configuration to automatically select the conversion information according to the selected resolving power.

Furthermore, in the foregoing embodiments, it is also possible to rewrite the content of the conversion information memory 1-10 by the instruction from the operation panel 1501 or from the host computer 300. In such case there may be adopted a configuration to designate the character set identifier, the character size and the character code either singly or in suitable combination.

[7th embodiment]

In the foregoing embodiments, the character patterns corresponding to the predetermined character codes are registered in the font cache memory according to the predetermined conversion information. In this 7th embodiment, the character codes of high frequency of use in the printing are registered. This 7th embodiment is also applied to the laser beam printer explained before.

Figure 26:
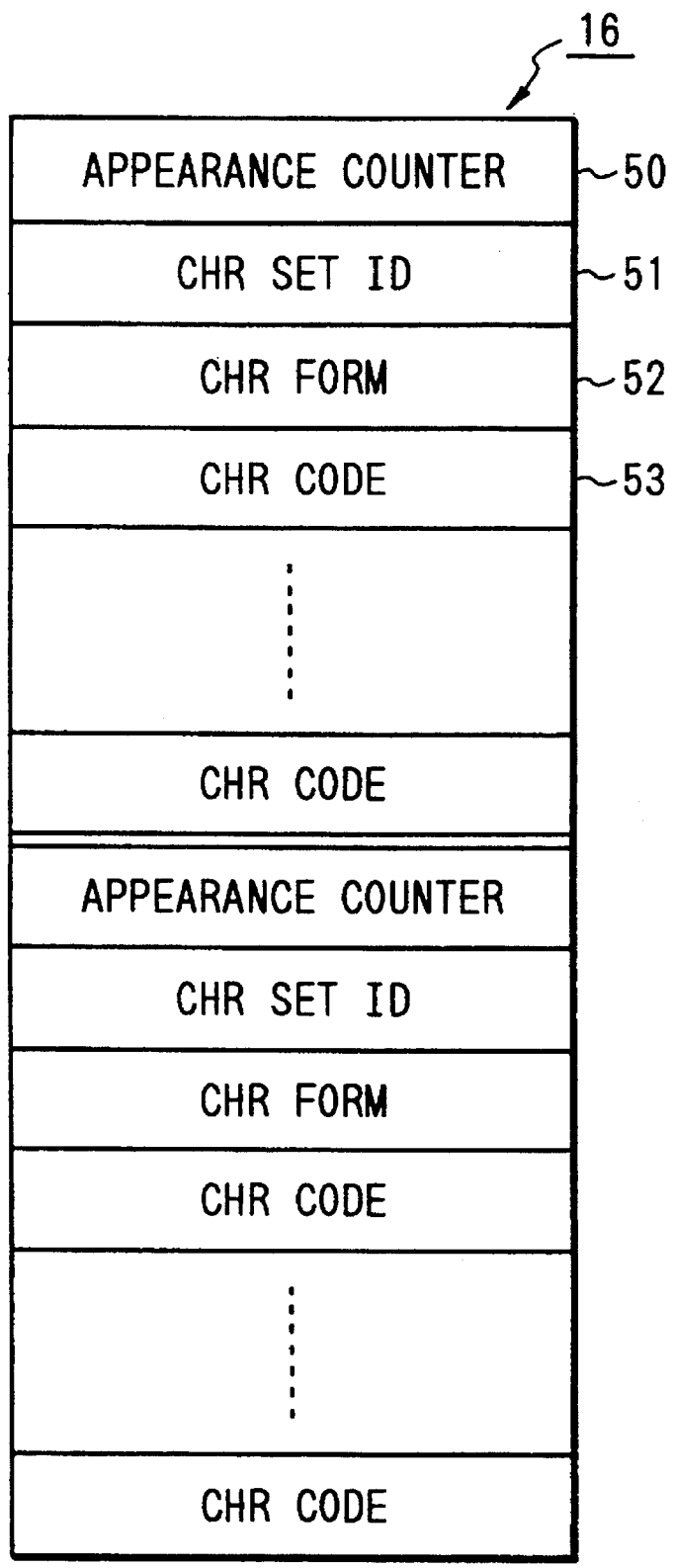
FIG. 26 is a view showing the data format in the conversion information memory in an embodiment 7.

FIG. 26 shows the data storage state in the conversion information memory 1-10 in the 7th embodiment. As shown in FIG. 26, there are stored an appearance counter 50 (to be explained later), a character set identifier 51 (representing the character style, such as Gothic), a character form 52 (width, height etc.) and a group 53 of character codes to be converted in advance, as a combination.

Figure 27:
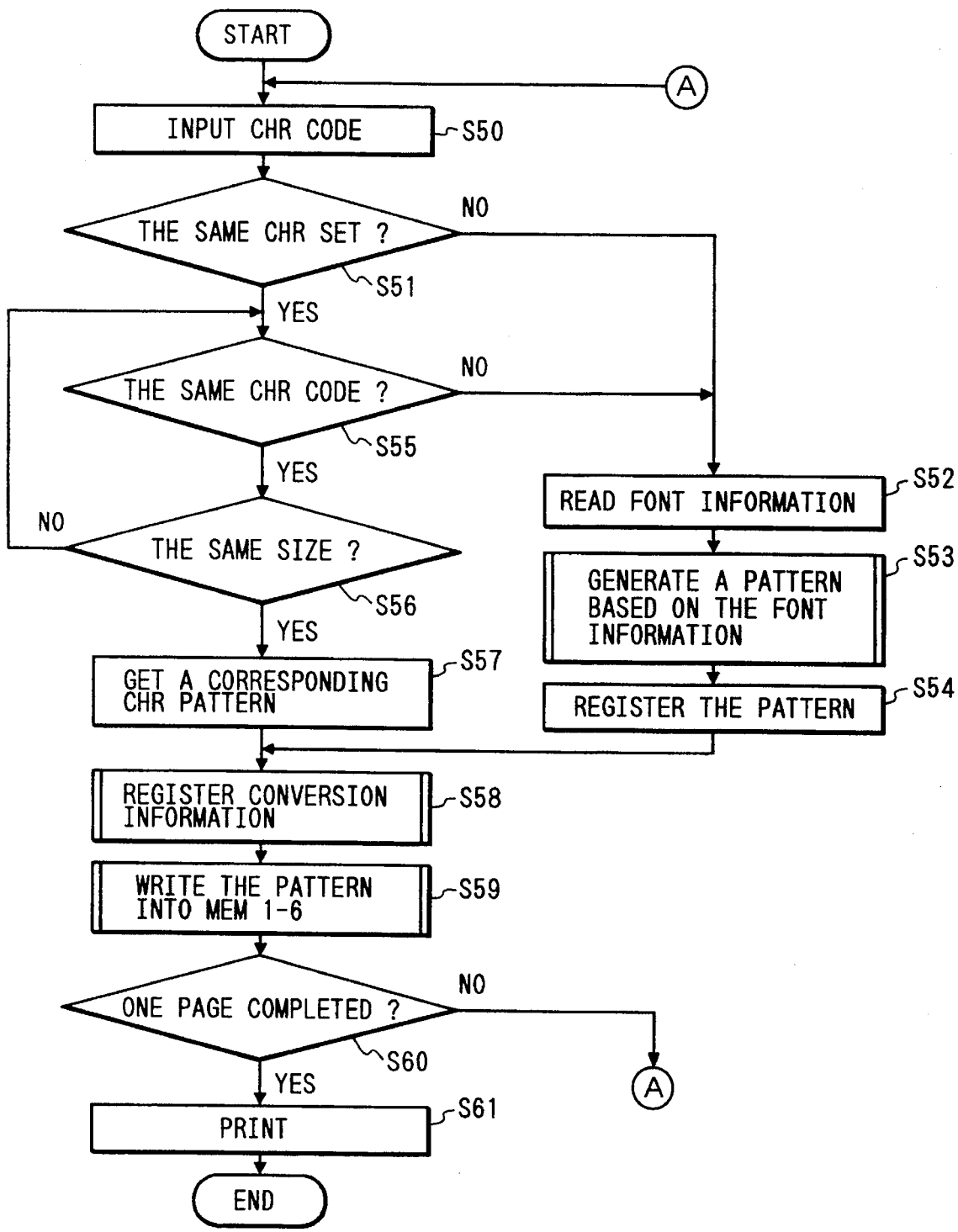
FIG. 27 is a flow chart showing the printing sequence.

FIG. 27 is a flow chart showing the printing process when image information consisting of the character codes is entered from the host computer 300, and there will be explained, in the following, a process of registering the conversion information of the frequently used character patterns into the conversion information memory 1-10.

It is assumed that data of a page are stored in the page buffer memory 1-4 prior to the start of this routine.

At first a step S50 reads the data of a character from the page buffer memory 1-4, and a step S51 discriminates whether a same character set has been registered, by referring to the information areas in the font cache memory 1-3. If not, a step S52 reads the corresponding font information from the font memory 1-2, then a step S53 generates a character pattern (developed in the RAM 1-1b) based on said information, and a step S54 registers the character pattern, generated in the step S53, in the font cache memory 1-3.

On the other hand, if the step S51 identifies that the same character set has been registered, a step S55 discriminates the presence of registration of a same character code, and, if present, a step S56 discriminates whether the character of a same size is present. These steps are repeated, and, if the character pattern of a same character code and a same size is not registered, the sequence proceeds to the step S52 for generating and registering a new character pattern. If the step S56 identifies the registration of the character of a same character code and a same size, a step S57 reads the corresponding character pattern from the font cache memory 1-3.

Then a step S58 registers the conversion information in the conversion information memory 1-10. The registered content is renewed by:

(1) writing the content (conversion information) of the information area 31 of the character pattern registered in the step S54 or the content (conversion information) of the information area 31 of the character pattern read from the font cache memory 1-3 in the step S57, and (2) an increment of the corresponding appearance counter.

Then a step S59 writes thus obtained character pattern into the bit map memory 1-6. A step S60 discriminates whether the conversion of input data of a page has been completed, and, if not, the sequence returns to the step S50 for repeating the above-explained process. If said conversion has been completed, a step S61 transfers the image data from the bit map memory 1-6 to the printer engine 1-7 in succession, thereby effecting the printing operation.

The data conversion in advance as explained above dispenses with the character conversion at the input of the character code, thereby enabling high-speed printing operation.

Figure 28:
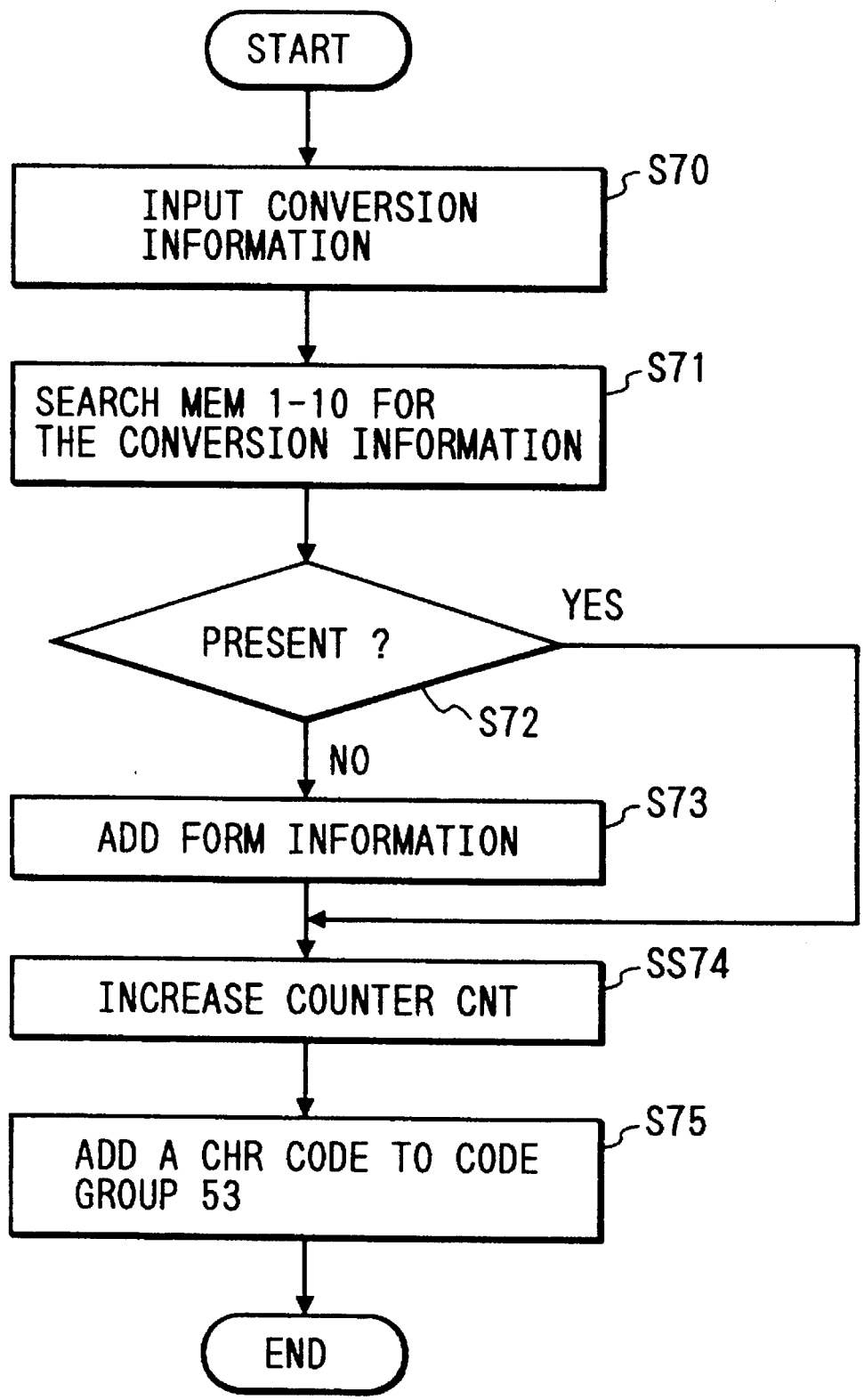
FIG. 28 is a flow chart showing the sequence of registration into the conversion information memory at the printing sequence.

FIG. 28 is a flow chart showing the registration into the conversion information memory 1-10, capable of specifying the character pattern of a high frequency of use and showing the detail of the step S58.

A step S70 receives the conversion information, consisting of the character set identifier, the character size and the character code. A step S71 searches the same combination of the character set identifier and the size within the conversion information memory 1-10. If a step S72 identifies that such combination is absent or present, the sequence respectively proceeds to a step S73 or S74.

The step S73 newly adds the form information of the conversion information, entered in the step S70, to the conversion information memory 1-10. The step S74 effects an increment of the appearance counter, corresponding to the form information of the conversion information. Said appearance counter is provided for each combination of the character set identifier and the size. More specifically, a counter is provided for each combination such as "Ming style, 50×50 dots", "Gothic style, 50×50 dots" or "Ming style, 40×40 dots", and the count is stepwise increased at each-entry of the character code of the same style and size. Then a step S75 adds the character code to the character code group 53 of the corresponding form information in the conversion information memory 1-10.

The conversion information is thus registered in the conversion information memory 1-10. Said conversion information memory 1-10 is composed of a non-volatile memory, and, at the next start of power supply to the apparatus, effects the registration of the character patterns in the font cache memory 1-3 utilizing the registered conversion information.

Figure 29:
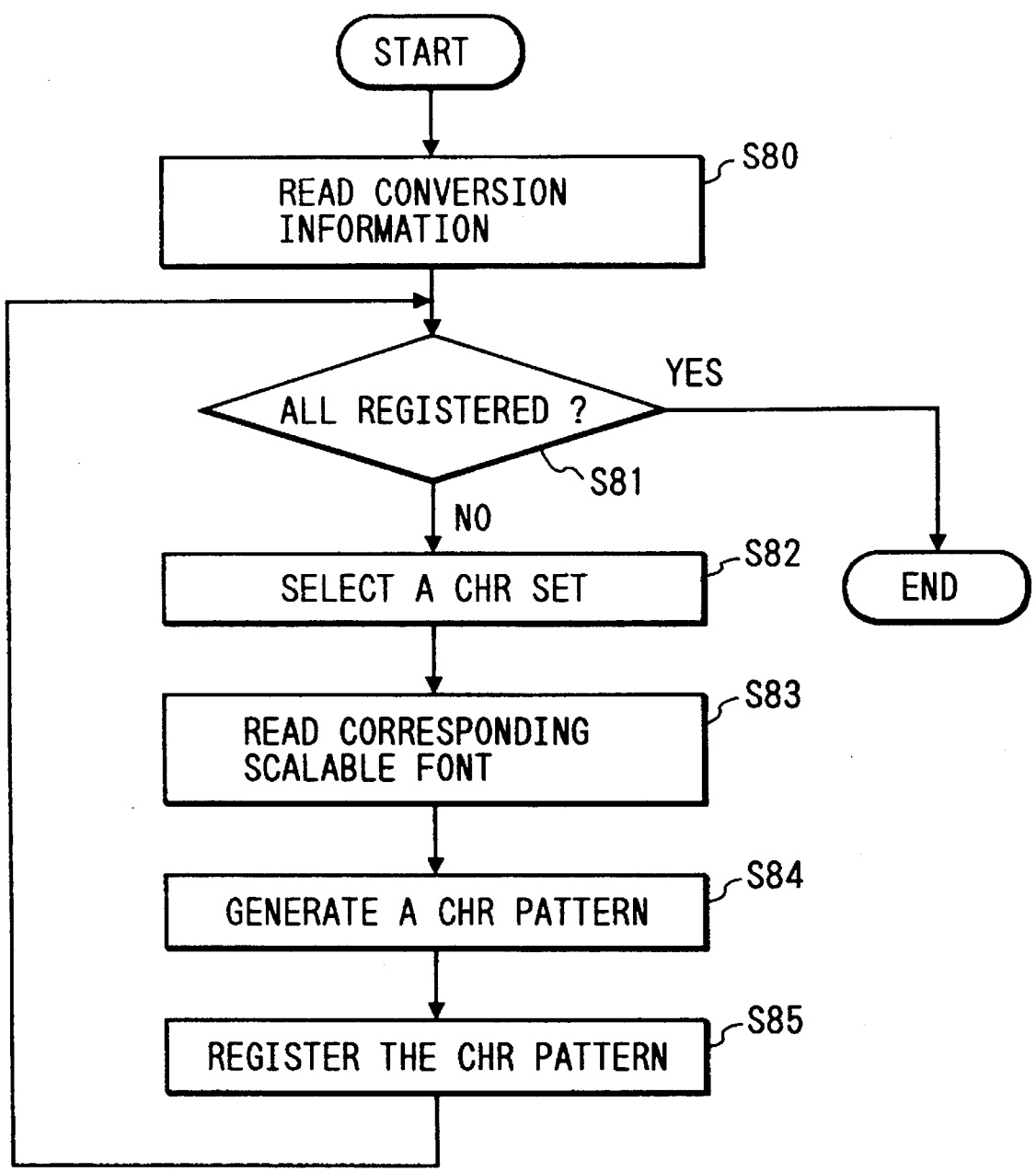
FIG. 29 is a flow chart showing the sequence of the character pattern registration into the font cache memory.

FIG. 29 is a flow chart showing the process of storing the character patterns in the font cache memory 1-3 in advance, utilizing the information (FIG. 26) registered in the conversion information memory 1-10.

A step S80 checks the appearance counters in the conversion information memory 1-10 and reads the conversion information of the highest frequency of appearance. The character patterns to be registered in advance are determined by said conversion information. A step S81 discriminates whether all the character patterns have been registered in the font cache memory 1-3, and, if not, the sequence proceeds to a step S82.

The step S82 selects a character set according to the conversion information, then a step S83 reads, from the font memory 1-2, a scalable font corresponding to the character code of said character set, then a step S84 generates a character pattern according to the character form stored in the conversion information memory 1-10, and a step S85 registers the generated character pattern, together with the conversion information, into the font cache memory 1-3. Then the sequence returns to the step S81, and the above-explained procedure is repeated for all the character codes stored in the conversion information memory 1-10. Upon completion of the registration for all the character codes, the routine is terminated.

In this 7th embodiment explained above, the character patterns are registered, according to their frequencies of use, in the font cache memory 1-3, so that the registration can be made efficiently according to the status of use.

[8th embodiment]

The conversion information memory 1-10 in the 7th embodiment may be provided with plural conversion information, which may be selected by an instruction from the operation panel 1501 or from the host computer 300.

FIGS. 30A and 30B show two sets of conversion information stored in the conversion information memory 1-10. Either of these two sets is designated for effecting the registration of the character patterns in the font cache memory 1-3 in advance.

Figure 31:
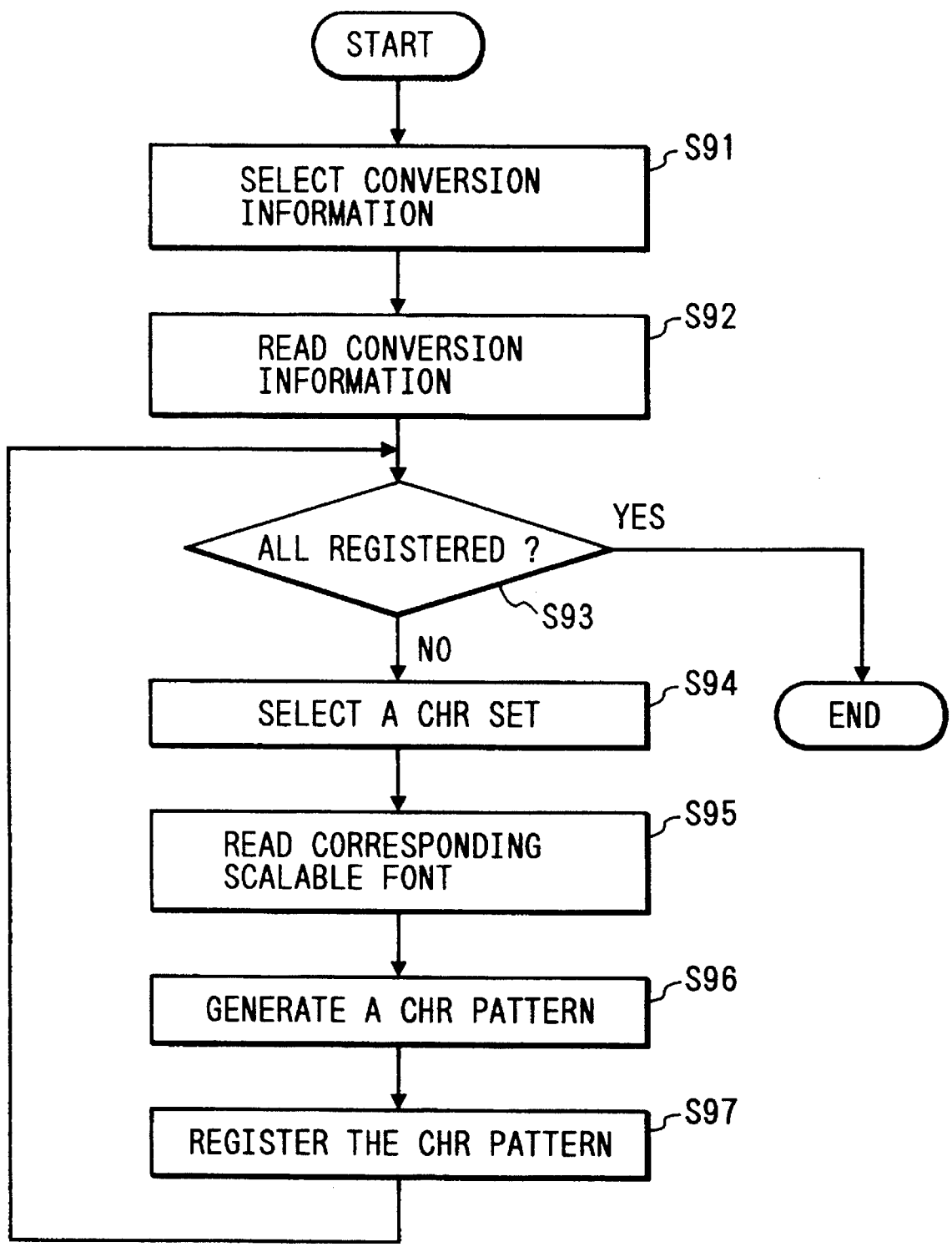
FIG. 31 is a flow chart showing the sequence of the character pattern registration into the font cache memory.

FIG. 31 is a flow chart showing the sequence of storage of the character patterns in the font cache memory 1-3 in advance in this 8th embodiment, wherein there are provided at least two sets of conversion information allowing to specify the frequently used character patterns.

A step S91 selects, among the plural sets of conversion information, stored in the conversion information memory 1-10, for specifying the frequently used character patterns, a set designated by the conversion information flag, which is set by a command from the operation panel 1501 of the apparatus or from the host computer 300. Then a step S92 checks the appearance counters in the conversion information memory 1-10 for the selected conversion information, and reads the conversion information in the descending order of the frequency of appearance. In this manner determined are the character patterns to be registered in advance. A step S93 discriminates whether all the conversion information, read in the step S92, have been registered, and, if not, the sequence proceeds to a step S94. The step S94 selects a character set according to the conversion information, then a step S95 reads, from the font memory 1-2, a scalable font corresponding to the character code of said character set, then a step S96 generates a character pattern according to the character form stored in the conversion information memory 1-10, and a step S97 registers the generated character pattern, together with the conversion information, in the font cache memory 1-3. Then the sequence returns to the step S93, and the above-explained sequence is repeated for all the character codes stored in the conversion information memory 1-10.

In the step S91 for selecting the conversion information, the conversion information flag is assumed to be designated for example from the operation panel, but it may also be automatically selected according to the configuration of the apparatus, for example based on the capacity of the font cache memory 1-3.

Also in an apparatus provided with plural control languages for analyzing the control information entered from the host computer 300, there may be provided conversion information for each control language, and the apparatus may be so constructed as to automatically recognize and select the conversion information corresponding to the control language.

Also in an apparatus capable of switching the resolving power of the printer engine, the apparatus may be so constructed as to automatically select the conversion information matching each resolving power.

Also in the foregoing embodiments the conversion information memory 1-10 stores the character set identifier, the character size and the character code, but such form of storage is not limitative. For example there may be stored the character set identifier only, or the combination of the character set identifier and the character size.

Also in the foregoing embodiments, the registration into the conversion information memory 1-10 is executed for each reception of a character code, but such mode of operation is not limitative. For example it is also possible to prepare a conversion information table in the RAM 1-1*b*, and to rewrite the conversion information memory 1-10 with the conversion information of highest frequency of appearance, at predetermined timings. In such case the appearance counters are not necessary in the conversion information memory 1-10.

Also in the foregoing embodiments, the registration of the character patterns into the font cache memory 1-3 is conducted at the start of power supply, according to the content of the conversion information memory 1-10, but such mode of operation is not limitative. Said registration into the font cache memory 13 may be conducted, for example, when the apparatus does not process the image data.

The present invention is applicable either to a system consisting of plural equipment, or to an apparatus consisting of a single equipment. It is naturally applicable also to a case it is attained by the supply of a program to a system or an apparatus.

As explained in the foregoing, the present invention generates patterns corresponding to predetermined codes and stores said patterns in a memory prior to the input of a code as image information, and utilizes a pattern corresponding to the input code, thereby shortening the time required for said pattern generation and attaining an increased processing speed.

Also the present invention generates patterns based on code information to be converted in advance to the patterns and on font scaler information, then stores thus generated patterns together with the corresponding code information and font scaler information, and utilizes the stored patterns based on the code information representing the pattern to be given as output, thereby controlling the output.

Also the present invention stores, in advance, plural font scalers required for converting the scalable font into a dot pattern, then selects a font scaler according to information for selecting one of said plural font scalers, and converts the scalable font into the dot pattern for caching, according to the selected font scaler.

What is claimed is:

1. An output control apparatus comprising:

font data memory means for storing first font data from which a character pattern is generated by a first font scaler and second font data from which a character pattern is generated by a second font scaler;

character pattern memory means for storing the character pattern generated by the first or second font scaler with information showing by which one of the first and second font scalers the character pattern was generated;

determining means for determining whether said character pattern memory means stores a character pattern generated by the first font scaler from the first font data corresponding to a pattern to be output; and output means for, in response to a determination by said determining means that said character pattern memory means stores a character pattern generated by the first font scaler from the first font data corresponding to the pattern to be output, outputting data based on the stored character pattern and, in response to a determination by said determining means that said character pattern memory means does not store the pattern, for generating a character pattern by means of the first font scaler from the first font data corresponding to the pattern to be output and outputting data based on the generated character pattern.

2. An apparatus according to claim 1, wherein said output means comprises a printer.

3. An apparatus according to claim 1, wherein said character pattern memory means comprises a cache memory.

4. An apparatus according to claim 1, wherein the font data stored in said font data memory means comprises outline font data.

5. An apparatus according to claim 1, wherein said character pattern memory means stores the character pattern, the information showing by which one of the first and second font scalers the character pattern was generated, and additionally character set identification information, code information and character shape information.

6. An apparatus according to claim 1, wherein said character pattern memory means comprises a first storage area for storing a character pattern generated from the first font data by the first font scaler and a second storage area for storing a character pattern generated from the second font data by the second font scaler.

7. An apparatus according to claim 1, further comprising means for controlling said character pattern memory means to store the another character pattern generated by said output means.

8. An output control method using a font data memory for storing first font data from which a character pattern is generated by a first font scaler and second font data from which a character pattern is generated by a second font scaler and a character pattern memory for storing the character pattern generated by the first or second font scaler with information showing by which one of the first and second font scalers the character pattern was generated, said method comprising the steps of:

determining whether the character pattern memory stores a character pattern generated by the first font scaler from the first font data corresponding to a pattern to be output; and in response to a determination in said determining step that the character pattern memory stores the character pattern generated by the first font scaler from the first font data corresponding to the pattern to be output, outputting data based on the stored character pattern and, in response to a determination in said determining step that the character pattern memory does not store the pattern, generating a character pattern by means of the first font scaler from the first font data corresponding to the pattern to be output and outputting data based on the generated character pattern.

9. A method according to claim 8, wherein, in said outputting step, the data is output using a printer.

10. A method according to claim 8, wherein the character pattern memory comprises a cache memory.

11. A memory according to claim 8, wherein the font data stored in the font data memory comprises outline font data.

12. A method according to claim 8, wherein the character pattern memory stores the character pattern, the information showing by which one of the first and second font scalers the character pattern was generated, and additionally character set identification information, code information and character shape information.

13. A method according to claim 8, wherein the character pattern memory comprises a first storage area for storing a character pattern generated from the first font data by the first font scaler and a second storage area for storing a character pattern generated from the second font data by the second font scaler.

14. A method according to claim 8, further comprising the step of controlling the character pattern memory to store the another character pattern generated in said outputting step.

* * * * *

UNITED STATES PATENT AND TRADEMARK OFFICE
CERTIFICATE OF CORRECTION

PATENT NO. : 5,617,525

DATED : April 1, 1997

INVENTOR(S): Akio Sugaya

It is certified that error appears in the above-identified patent and that said Letters Patent is hereby corrected as shown below:

COLUMN 4
  Line 31, "cross sectional" should read
    --cross-sectional--;
  Line 42, "memory 104" should read --memory 1-4--;
  Line 50, "memory 104" should read --memory 1-4--;
  Line 54, "memory 104" should read --memory 1-4--.

COLUMN 8
  Line 26, "presented" should read --represented--.

COLUMN 10
  Line 27, "explained is" should read --is explained--.

COLUMN 12
  Line 11, "it" should read --but it--;
  Line 16, "a" should read --one--.

COLUMN 15
  Line 11, "iamge" should read --image--.
  Line 43, "information the" should read --information
    on the--.

COLUMN 17
  Line 40, "memory 14," should read --memory 1-4,--;
  Line 45, "memory 12," should read --memory 1-2,--.

UNITED STATES PATENT AND TRADEMARK OFFICE
CERTIFICATE OF CORRECTION

PATENT NO. : 5,617,525

DATED : April 1, 1997

INVENTOR(S) : Akio Sugaya

It is certified that error appears in the above-identified patent and that said Letters Patent is hereby corrected as shown below:

COLUMN 18

Line 8, "5th converters" should read --5th embodiment converts--;
Line 46, "apparatus of" should read --apparatus--.

COLUMN 20

Line 45, "each-entry" should read --each entry--.

COLUMN 22

Line 30, "memory 13" should read --memory 1-3--;
Line 37, "it" should read --where it--.

Signed and Sealed this

Fourteenth Day of October, 1997

Attest:

BRUCE LEHMAN

*Attesting Officer*  *Commissioner of Patents and Trademarks*